United States Patent
Re et al.

(10) Patent No.: US 12,527,785 B2
(45) Date of Patent: Jan. 20, 2026

(54) RENIN-ANGIOTENSIN-ALDOSTERONE SYSTEM (RAAS) INHIBITORS IN THE TREATMENT OF PANCREATIC DUCTAL CARCINOMA

(71) Applicant: OCHSNER CLINIC FOUNDATION, New Orleans, LA (US)

(72) Inventors: Richard N. Re, New Orleans, LA (US); Xin Zhang, New Orleans, LA (US); Li Li, New Orleans, LA (US)

(73) Assignee: OCHSNER CLINIC FOUNDATION, New Orleans, LA (US)

(*) Notice: Subject to any disclaimer, the term of this patent is extended or adjusted under 35 U.S.C. 154(b) by 85 days.

(21) Appl. No.: 18/095,384

(22) Filed: Jan. 10, 2023

(65) Prior Publication Data
US 2024/0226089 A1    Jul. 11, 2024

(51) Int. Cl.
*A61K 31/472*    (2006.01)
*A61K 31/4178*   (2006.01)
*A61K 31/4184*   (2006.01)
*A61K 31/437*    (2006.01)
*A61P 1/18*      (2006.01)
*A61P 35/00*     (2006.01)

(52) U.S. Cl.
CPC ........ *A61K 31/472* (2013.01); *A61K 31/4178* (2013.01); *A61K 31/4184* (2013.01); *A61K 31/437* (2013.01); *A61P 1/18* (2018.01); *A61P 35/00* (2018.01)

(58) Field of Classification Search
CPC .............. A61K 31/472; A61K 31/4178; A61K 31/4184; A61K 31/437; A61P 1/18; A61P 35/00
See application file for complete search history.

(56) References Cited

PUBLICATIONS

Ishiguro, Cancer Biology & Therapy, 16:2, 307-316, 2015 (Year: 2015).*
Sakurai, Pancreatology, 2011;11:7-13 (Year: 2011).*
Passos-Silva, Trends in Pharmacological Sciences, 2015, vol. 36, No. 5 (Year: 2015).*
Mcghee, Surgery, vol. 150, No. 2, 2011 (Year: 2011).*
Gong, Pancreas, 2010;39: 581-594 (Year: 2010).*
Guo, ACS Omega 2021, 6, 15412-15420 (Year: 2021).*
Rodrigues-Ferreria (Frontiers in pharmacology, 2015, vol. 6, Art. 24 (Year: 2015).*
Blankley et al., Synthesis and structure-activity relationships of a novel series of non-peptide angiotensin II receptor binding inhibitors specific for the AT2 subtype J. Med. Chem. 34(11) (1991); pp. 3248-3260.
Ito, et al., Chemopreventive effects of angiotensin II receptor type 2 agonist on prostate carcinogenesis by the down-regulation of the androgen receptor, Oncotarget, 2018, vol. 9, (No. 17), pp. 13859-13869.

* cited by examiner

*Primary Examiner* — Jeffrey H Murray
*Assistant Examiner* — Luisalberto Gonzalez
(74) *Attorney, Agent, or Firm* — Schwabe, Williamson & Wyatt, P.C.

(57) ABSTRACT

Embodiments provide for methods of treatment for subjects suffering from a condition/disorder or disease for which the renin-angiotensin-aldosterone system (RAAS) plays at least some role. In one example, a method comprises administering to the subject an effective amount of one or more of an angiotensin receptor AT2R antagonist for a duration sufficient to elicit a desired response in the subject suffering from pancreatic cancer. The administering acts to reduce proliferation of tumor cells associated with the pancreatic cancer.

5 Claims, 2 Drawing Sheets

RENIN-ANGIOTENSIN-ALDOSTERONE SYSTEM (RAAS) INHIBITORS IN THE TREATMENT OF PANCREATIC DUCTAL CARCINOMA

TECHNICAL FIELD

Embodiments herein relate to the field of cancer treatment, and, more specifically, to the use of Renin-Angiotensin-Aldosterone System (RAAS) inhibitors in the treatment of pancreatic cancer.

BACKGROUND

Dysregulation of the renin-angiotensin system (RAS) in a variety of cancers has been described, although the implications of this dysregulation are not well understood. The RAS is a major regulator of blood pressure and intravascular volume. Renin released from the kidney acts on hepatically synthesized angiotensinogen (Aogen) in the blood to generate a decapeptide, angiotensin I (AI). AI in turn is cleaved by angiotensin converting enzyme (ACE) to an octapeptide, angiotensin II (AII). AII, acting through one of two receptors (AT1R or AT2R), is a potent vasoconstrictor and stimulator of the adrenal salt retaining (mineralocorticoid) hormone aldosterone. Aldosterone in turn acts through mineralocorticoid receptors (MRs) thereby creating the renin angiotensin aldosterone system (RAAS).

Pancreatic ductal adenocarcinoma (PDA) is an extremely aggressive and difficult to treat cancer with a five year survival rate of less than 5%. Many PDA cells contain components of the RAS although they often lack the enzyme, renin, which drives this system in the circulation. The issue of the RAS in PDA has been widely studied, yet there remains no consensus about the role of the RAS, and there has been only marginal and inconsistent benefit derived by patients from taking inhibitors of the RAS, for example ACE inhibitors (ACEIs) or angiotensin receptor blockers (ARBs). Thus, treatment options are limited and improved treatment methodologies are needed, for PDA as well as other cancers that contain components of the RAS.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
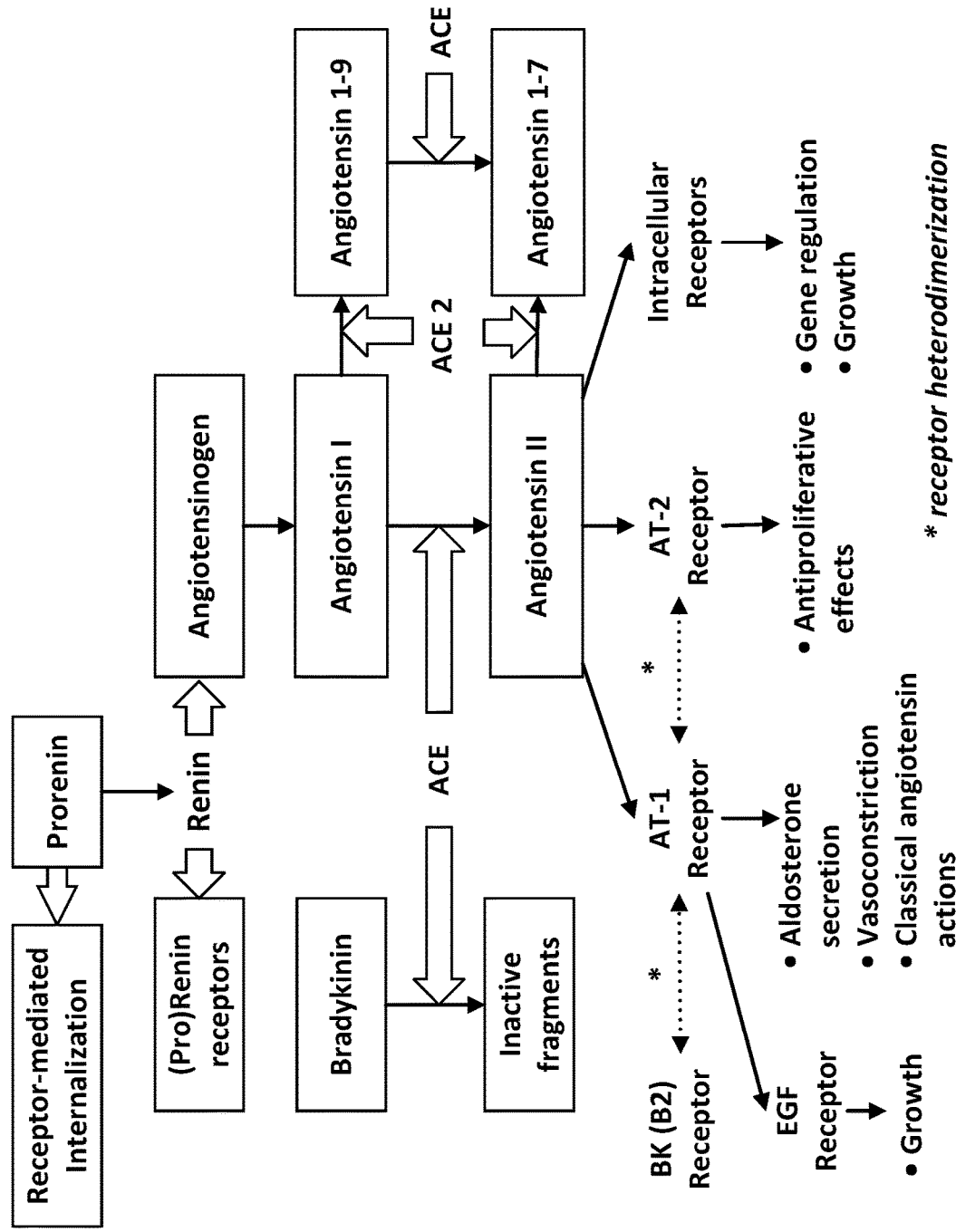
FIG. 1 schematically illustrates a high-level overview of the RAAS.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Unless otherwise noted, technical terms are used according to conventional usage. Definitions of common terms in molecular biology can be found in Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); and Robert A. Meyers (ed.), Molecular Biology and Biotechnology: a Comprehensive Desk Reference, published by VCH Publishers, Inc., 1995 (ISBN 9780471185710); and other similar references. The singular terms "a," "an," and "the" include plural referents unless context clearly indicates otherwise. Similarly, the word "or" is intended to include "and" unless the context clearly indicates otherwise. It is further to be understood that any base sizes or amino acid sizes, and any molecular weight or molecular mass values, given for nucleic acids or polypeptides are approximate, and are provided for description. Although methods and materials similar or equivalent to those described herein can be used in the practice or testing of this disclosure, suitable methods and materials are described below. Any publications, patent applications, patents, and other references mentioned herein are incorporated by reference in their entirety. In case of conflict, the present specification, including explanations of terms, will control.

In addition, the materials, methods, and examples are illustrative only and are not intended to be limiting.

I. OVERVIEW OF SEVERAL EMBODIMENTS

Figure 2:
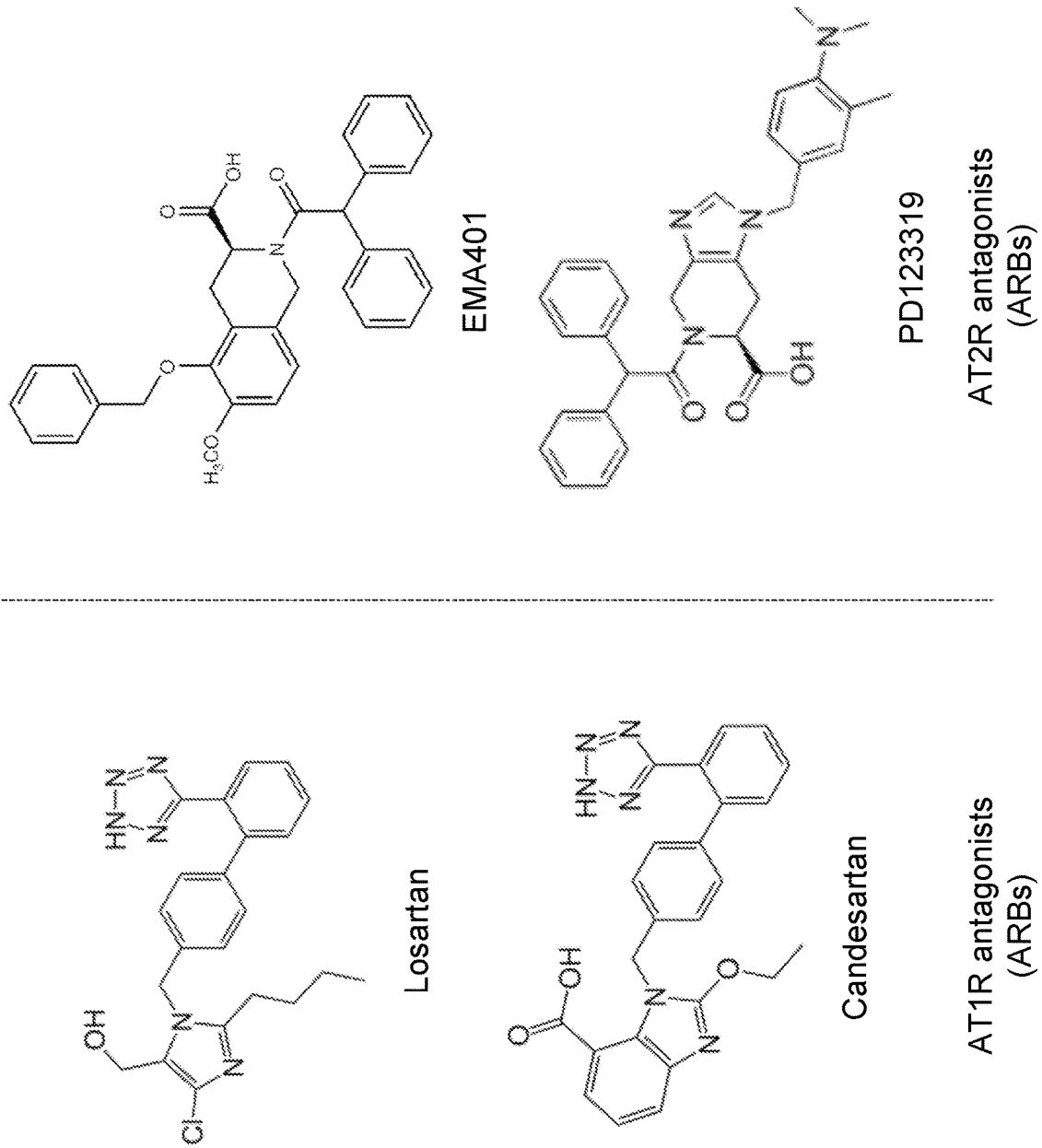
FIG. 2 depicts a number of compounds capable of inhibiting one or more components of the RAAS.

While there is interest in the role of the RAS in PDA, an overlooked aspect is the possible role of the RAAS and the MR. Furthermore, there is a lack of attention being paid to duration of therapy (and its potential effects on reversing angiotensin II-mediated epigenetic change), to the effects of other factors such as IGF effects on cell sensitivity to the stimulatory actions of angiotensin II in vivo, or to the accessibility of intracellular angiotensin II sites to drugs. Yet all these issues must be taken into account to assess the in vitro and in vivo data that has been generated to date and to design new treatment strategies for the use of RAAS blockers against cancer, and PDA in particular. For reference, FIG. 1 depicts a high-level overview of the components of the RAAS. FIG. 2 depicts a select number of RAAS inhibitors relevant to the present disclosure.

To date only equivocal and small clinical benefit from RAS acting agents has been shown, and any benefit seen is ascribed to effects of RAS acting agents on the tumor microenvironment and intratumor immune modulation. No attention has been paid to intracellular RAS action, self-sustaining positive feedback RAS loops, to synergism between RAS acting drugs, synergism with other RAS relevant drugs such as mineralocorticoid receptor antagonists, or the dose of RAS agent. With respect to dosage, this is important in terms of tissue and cell penetration of the drugs. The role of the duration of therapy and its effect on epigenetic change, like the role of in vivo modifying factors like insulin and IGF, are not being considered. The effectiveness of higher doses of available RAS/RAAS drugs, alone or in combination, has not been explored (e.g., doses high enough to adequately block tissue and intracellular RAS/RAAS activity over time, but clinically tolerable).

Accordingly, disclosed herein are RAAS modulatory agents and methods of using such to treat a condition/disorder or disease for which modulating at least one component of the RAAS improves at least a sign, symptom or other clinically relevant parameter in a subject suffering from the condition/disorder or disease.

In one embodiment, a method of altering one or more components of the RAAS in a subject suffering from a condition or disease may comprise administering to the subject an effective amount of one or more of an angiotensin receptor AT2R antagonist for a duration sufficient to elicit a desired response in the subject suffering from the condition or disease.

In another embodiment, a method of treating a subject having a condition/disorder or disease that is at least in part regulated by activity of the renin-angiotensin-aldosterone system (RAAS), comprises contacting a cell or cells of the subject with an effective amount of one or more RAAS modulatory agents, the one or more RAAS modulatory agents comprising one or more of an angiotensin receptor AT2R antagonist and an angiotensin receptor AT1R antagonist to alter one or more components of the RAAS, thereby treating the condition/disorder or disease.

In yet another embodiment, a method of treating a subject suffering from pancreatic cancer comprises administering to the subject an effective amount of one or more of an angiotensin receptor AT2R antagonist and an angiotensin receptor AT1R antagonist for a duration sufficient to elicit a desired response in the subject suffering from pancreatic cancer. In a particular example, the pancreatic cancer comprises pancreatic ductal adenocarcinoma.

The present disclosure involves the suppression of cancer cell growth (both in vitro and in vivo), and in particular PDCA growth, by targeting the renin angiotensin aldosterone system (RAAS) using specific agents to inhibit the system. The major effector protein of the RAAS, angiotensin II, in large part acts via two angiotensin receptors (AT1R and AT2R). The results of the present disclosure suggest a role for AT2R inhibition in treating PDCA by suppressing tumor growth. Embodiments of the present disclosure show that AT2R blockade with this active/experimental drug EMA401 reduces PDCA cell proliferation in culture and tumor burden in an in vivo orthotopic mouse model. Moreover, embodiments show that the AT2R blocker EMA401 synergizes with AT1R blockers (e.g., Losartan or Candesartan) in cell culture. Hence, this provides a novel approach to treat PDCA. Thus, according to the present disclosure, EMA401 or other AT2R blockers, AT1R blockers, alone or in combination may be used for the prevention of PDCA in patients at high risk for PDCA including those with pancreatic mucinous cystadenomas and intraductal papillary mucinous neoplasms.

II. TERMS

In order to facilitate review of the various embodiments of this disclosure, the following explanations of specific terms are provided:

Adjunctive therapy: A treatment used in combination with a primary treatment to improve the effects of the primary treatment. As a representative example, adjunctive therapy includes treatment of a cancer patient with one or more therapeutic agents (e.g., one or more of ARBs), where the therapeutic agent is administered prior to, during/concurrently or after a primary treatment (e.g., chemotherapy, radiation, etc.).

Administration: To provide or give a subject one or more agents, such as an agent that antagonizes one or more of an angiotensin receptor. The one or more agents may treat one or more symptoms associated with a condition/disorder or disease including but not limited to cancer, by any effective route. Exemplary routes of administration include, but are not limited to, injection (such as subcutaneous, intramuscular, intradermal, intraperitoneal, and intravenous), oral, sublingual, rectal, transdermal, intranasal, vaginal and inhalation routes.

Agent: Any protein, nucleic acid molecule (including chemically modified nucleic acids), compound, antibody, small molecule, organic compound, inorganic compound, or other molecule of interest. Agent can include a therapeutic agent, a diagnostic agent or a pharmaceutical agent. A therapeutic or pharmaceutical agent is one that alone or together with an additional compound induces the desired response (such as inducing a therapeutic or prophylactic effect when administered to a subject, including but not limited to treating a subject suffering from cancer. Discussed herein, an agent may be referred to as a modulatory agent (e.g., RAAS modulatory agent).

In some examples, an agent can act directly or indirectly to antagonize one or more of an angiotensin receptor, among others. This in turn may alter expression of one or more of renin, angiotensin I, angiotensin II, and aldosterone, among others.

The therapeutic agent may improve a patient outcome. For example, with respect to cancer, improving a cancer patient outcome may include a remission of the cancer (e.g., decrease in number of cancer cells and/or reduction in tumor size), an elimination of the cancer in the patient, a reduction or elimination of cancer metastasis, an improvement in immune system function, etc.

Analog or Derivative: A compound which is sufficiently homologous to a compound such that it has a similar functional activity for a desired purpose as the original compound. Analog or derivative refers to a form of a substance, including but not limited to losartan, candesartan, etc., which has at least one functional group altered, added, or removed, compared with a parent compound. "Functional group" refers to a radical, other than a hydrocarbon radical, that adds a physical or chemical property to a substance.

Angiotensin II receptor antagonist/blocker (ARBs): Compounds which block the action of angiotensin II by preventing angiotensin II from binding to angiotensin II receptors. Examples include but are not limited to Azilsartan (Edarbi), Candesartan (Atacand), Eprosartan, Irbesartan (Avapro), Losartan (Cozaar), Olmesartan (Benicar), Telmisartan (Micardis), Valsartan (Diovan), EMA401, PD123319. Also relevant to the present disclosure are analogs or derivatives of any one of the above mentioned ARBs, or other ARBs.

Antagonist: Refers to a moiety that binds to a receptor (e.g., angiotensin receptor, etc.) at the same site or near the same site as an agonist (e.g., angiotensin), but which does not activate the response typically initiated by the active form of the receptor, and thereby inhibits or neutralizes the response. The term antagonist may also refer to a moiety that binds to a receptor agonist, thereby sequestering the agonist from interaction with its cognate receptor.

Biological activity: The beneficial or adverse effects of an agent on living matter. When the agent is a complex chemical mixture, this activity is exerted by the substance's active ingredient or pharmacophore, but can be modified by the other constituents. Activity may be dosage-dependent, and different biological activity may result from different dosages. In one example, the agent antagonizes one or more of an angiotensin receptor (AT1R and/or AT2R), which reduces or delays one or more signs or symptoms associated with cancer.

Cancer: A physiological condition in mammals in which a population of cells are characterized by unregulated cell growth. Examples of cancer relevant to the present disclosure include, but are not limited to, Acanthoma, Acinic cell carcinoma, Acoustic neuroma, Acral lentiginous melanoma, Acrospiroma, Acute eosinophilic leukemia, Acute lymphoblastic leukemia, Acute megakaryoblastic leukemia, Acute monocytic leukemia, Acute myeloblastic leukemia with maturation, Acute myeloid dendritic cell leukemia, Acute myeloid leukemia, Acute promyelocytic leukemia, Adamantinoma, Adenocarcinoma, Adenoid cystic carcinoma, Adenoma, Adenomatoid odontogenic tumor, Adrenocortical carcinoma, Adult T-cell leukemia, Aggressive NK-cell leukemia, AIDS-Related Cancers, AIDS-related lymphoma, Alveolar soft part sarcoma, Ameloblastic fibroma, Anal cancer, Anaplastic large cell lymphoma, Anaplastic thyroid cancer, Angioimmunoblastic T-cell lymphoma, Angiomyolipoma, Angiosarcoma, Appendix cancer, Astrocytoma, Atypical teratoid rhabdoid tumor, Basal cell carcinoma, Basal-like carcinoma, B-cell leukemia, B-cell lymphoma, Bellini duct carcinoma, Biliary tract cancer, Bladder cancer, Blastoma, Bone Cancer, Bone tumor, Brain Stem Glioma, Brain Tumor, Breast Cancer, Brenner tumor, Bronchial Tumor, Bronchioloalveolar carcinoma, Brown tumor, Burkitt's lymphoma, Cancer of Unknown Primary Site, Carcinoid Tumor, Carcinoma, Carcinoma in situ, Carcinoma of the penis, Carcinoma of Unknown Primary Site, Carcinosarcoma, Castleman's Disease, Central Nervous System Embryonal Tumor, Cerebellar Astrocytoma, Cerebral Astrocytoma, Cervical Cancer, Cholangiocarcinoma, Chondroma, Chondrosarcoma, Chordoma, Choriocarcinoma, Choroid plexus papilloma, Chronic Lymphocytic Leukemia, Chronic monocytic leukemia, Chronic myelogenous leukemia, Chronic Myeloproliferative Disorder, Chronic neutrophilic leukemia, Clear-cell tumor, Colon Cancer, Colorectal cancer, Craniopharyngioma, Cutaneous T-cell lymphoma, Degos disease, Dermatofibrosarcoma protuberans, Dermoid cyst, Desmoplastic small round cell tumor, Diffuse large B cell lymphoma, Dysembryoplastic neuroepithelial tumor, Embryonal carcinoma, Endodermal sinus tumor, Endometrial cancer, Endometrial Uterine Cancer, Endometrioid tumor, Enteropathy-associated T-cell lymphoma, Ependymoblastoma, Ependymoma, Epithelioid sarcoma, Erythroleukemia, Esophageal cancer, Esthesioneuroblastoma, Ewing Family of Tumor, Ewing Family Sarcoma, Ewing's sarcoma, Extracranial Germ Cell Tumor, Extragonadal Germ Cell Tumor, Extrahepatic Bile Duct Cancer, Extramammary Paget's disease, Fallopian tube cancer, Fetus in fetu, Fibroma, Fibrosarcoma, Follicular lymphoma, Follicular thyroid cancer, Gallbladder Cancer, Ganglioglioma, Ganglioneuroma, Gastric Cancer, Gastric lymphoma, Gastrointestinal cancer, Gastrointestinal Carcinoid Tumor, Gastrointestinal Stromal Tumor, Gastrointestinal stromal tumor, Germ cell tumor, Germinoma, Gestational choriocarcinoma, Gestational Trophoblastic Tumor, Giant cell tumor of bone, Glioblastoma multiforme, Glioma, Gliomatosis cerebri, Glomus tumor, Glucagonoma, Gonadoblastoma, Granulosa cell tumor, Hairy Cell Leukemia, Hairy cell leukemia, Head and Neck Cancer, Head and neck cancer, Heart cancer, Hemangioblastoma, Hemangiopericytoma, Hemangiosarcoma, Hematological malignancy, Hepatocellular carcinoma, Hepatosplenic T-cell lymphoma, Hereditary breast-ovarian cancer syndrome, Hodgkin Lymphoma, Hodgkin's lymphoma, Hypopharyngeal Cancer, Hypothalamic Glioma, Inflammatory breast cancer, Intraocular Melanoma, Islet cell carcinoma, Islet Cell Tumor, Juvenile myelomonocytic leukemia, Kaposi Sarcoma, Kidney Cancer, Klatskin tumor, Krukenberg tumor, Laryngeal Cancer, Lentigo maligna melanoma, Leukemia, Lip and Oral Cavity Cancer, Liposarcoma, Lung cancer, Luteoma, Lymphangioma, Lymphangiosarcoma, Lymphoepithelioma, Lymphoid leukemia, Lymphoma, Macroglobulinemia, Malignant Fibrous Histiocytoma, Malignant fibrous histiocytoma, Malignant Fibrous Histiocytoma of Bone, Malignant Glioma, Malignant Mesothelioma, Malignant peripheral nerve sheath tumor, Malignant rhabdoid tumor, Malignant triton tumor, MALT lymphoma, Mantle cell lymphoma, Mast cell leukemia, Mediastinal germ cell tumor, Mediastinal tumor, Medullary thyroid cancer, Medulloblastoma, Medulloepithelioma, Melanoma, Meningioma, Merkel Cell Carcinoma, Mesothelioma, Metastatic Squamous Neck Cancer with Occult Primary, Metastatic urothelial carcinoma, Mixed Mullerian tumor, Monocytic leukemia, Mouth Cancer, Mucinous tumor, Multiple Endocrine Neoplasia Syndrome, Multiple myeloma, Mycosis Fungoides, Myelodysplastic Disease, Myelodysplastic Syndromes, Myeloid leukemia, Myeloid sarcoma, Myeloproliferative Disease, Myxoma, Nasal Cavity Cancer, Nasopharyngeal Cancer, Nasopharyngeal carcinoma, Neoplasm, Neurinoma, Neuroblastoma, Neurofibroma, Neuroma, Nodular melanoma, Non-Hodgkin lymphoma, Nonmelanoma Skin Cancer, Non-Small Cell Lung Cancer, Ocular oncology, Oligoastrocytoma, Oligodendroglioma, Oncocytoma, Optic nerve sheath meningioma, Oral cancer, Oropharyngeal Cancer, Osteosarcoma, Ovarian cancer, Ovarian Epithelial Cancer, Ovarian Germ Cell Tumor, Ovarian Low Malignant Potential Tumor, Paget's disease of the breast, Pancoast tumor, Pancreatic cancer, Pancreatic ductal adenocarcinoma, Papillary thyroid cancer, Papillomatosis, Paraganglioma, Paranasal Sinus Cancer, Parathyroid Cancer, Penile Cancer, Perivascular epithelioid cell tumor, Pharyngeal Cancer, Pheochromocytoma, Pineal Parenchymal Tumor of Intermediate Differentiation, Pineoblastoma, Pituicytoma, Pituitary adenoma, Pituitary tumor, Plasma Cell Neoplasm, Pleuropulmonary blastoma, Polyembryoma, Precursor T-lymphoblastic lymphoma, Primary central nervous system lymphoma, Primary effusion lymphoma, Primary Hepatocellular Cancer, Primary Liver Cancer, Primary peritoneal cancer, Primitive neuroectodermal tumor, Prostate cancer, Pseudomyxoma peritonei, Rectal Cancer, Renal cell carcinoma, Respiratory Tract Carcinoma Involving the NUT Gene on Chromosome 15, Retinoblastoma, Rhabdomyoma, Rhabdomyosarcoma, Richter's transformation, Sacrococcygeal teratoma, Salivary Gland Cancer, Sarcoma, Schwannomatosis, Sebaceous gland carcinoma, Secondary neoplasm, Seminoma, Serous tumor, Sertoli-Leydig cell tumor, Sex cord-stromal tumor, Sezary Syndrome, Signet ring cell carcinoma, Skin Cancer, Small blue round cell tumor, Small cell carcinoma, Small cell Lung Cancer, Small cell lymphoma, Small intestine cancer, Soft tissue sarcoma, Somatostatinoma, Soot wart, Spinal Cord Tumor, Spinal tumor, Splenic marginal zone lymphoma, Squamous cell carcinoma, Stomach cancer, Superficial spreading melanoma, Supratentorial Primitive Neuroectodermal Tumor, Surface epithelial-stromal tumor, Synovial sarcoma, T-cell acute lymphoblastic leukemia, T-cell large granular lymphocyte leukemia, T-cell leukemia, T-cell lymphoma, T-cell prolymphocytic leukemia, Teratoma, Terminal lymphatic cancer, Testicular cancer, Thecoma, Throat Cancer, Thymic Carcinoma, Thymoma, Thyroid cancer, Transitional Cell Cancer of Renal Pelvis and Ureter, Transitional cell carcinoma, Urachal cancer, Urethral cancer, Urogenital neoplasm, Uterine sarcoma, Uveal melanoma, Vaginal Cancer, Verner Morrison syndrome, Verrucous carcinoma, Visual Pathway Glioma, Vulvar Cancer, Waldenstrom's macroglobulinemia, Warthin's tumor, and Wilms' tumor.

Neoplasia, malignancy, cancer and tumor may be used interchangeably and refer to abnormal growth of a tissue or cells that results from excessive cell division. The amount of a tumor in an individual is the "tumor burden" which can be measured as the number, volume, or weight of the tumor. A tumor that does not metastasize is referred to as "benign." A tumor that invades the surrounding tissue and/or can metastasize is referred to as "malignant." A "non-cancerous tissue" is a tissue from the same organ wherein the malignant neoplasm formed, but does not have the characteristic pathology of the neoplasm. Generally, noncancerous tissue appears histologically normal. A "normal tissue" is tissue from an organ, wherein the organ is not affected by cancer or another disease or disorder of that organ. A "cancer-free" subject has not been diagnosed with a cancer of that organ and does not have detectable cancer.

Symptoms of cancer may include but are not limited to persistent cough or blood-tinged saliva, a change in bowel habits, blood in the stool, unexplained anemia (low blood count), breast lump or breast discharge, lumps in testicles, a change in urination, blood in urine, hoarseness, persistent lumps or swollen glands, obvious change of a wart or mole, indigestion, difficulty swallowing, unusual vaginal bleeding or discharge, unexpected weight loss, night sweats, or fever, continued itching in the anal or genital area, nonhealing sores, headaches, back pain, pelvic pain, bloating, jaundice, blood clots and diabetes, among others.

CC50 (50% cytotoxic concentration): A concentration of a compound required for the reduction of cell viability by 50%.

Clinical outcome: Refers to the health status of a patient following treatment for a disease or disorder, or in the absence of treatment. Clinical outcomes include, but are not limited to, an increase in the length of time until death, a decrease in the length of time until death, an increase in the chance of survival, an increase in the risk of death, survival, disease-free survival, chronic disease, metastasis, advanced or aggressive disease, disease recurrence, death, and favorable or poor response to therapy.

Contacting: Placement in direct physical association, including both a solid and liquid form. Contacting an agent with a cell can occur in vitro by adding the agent to isolated cells or in vivo by administering (e.g., orally) the agent to a subject.

Control: A sample or standard used for comparison with a test sample, such as a biological sample obtained from a patient (or plurality of patients) without a particular disease or condition, such as a patient or patients not having experienced cancer. In some embodiments, the control is a sample obtained from a healthy patient (or plurality of patients) (also referred to herein as a "normal" control), such as a normal biological sample. A control represents an untreated sample (e.g., absence of therapeutic agent) for comparison with a treated sample (e.g., treated with the therapeutic agent).

Decrease: To reduce the quality, amount, or strength of something. In one example, a therapy (e.g., administration of a therapeutic agent of the present disclosure) decreases one or more symptoms associated with cancer, for example as compared to the response in the absence of the therapy.

Derivative: A chemical substance that differs from another chemical substance by one or more functional groups. Preferably, a derivative retains a biological activity of a molecule from which it was derived. In some examples, a derivative enhances a biological activity of a molecule from which it was derived.

Diagnosis: The process of identifying a disease, such as cancer, by its signs, symptoms and results of various tests. The conclusion reached through the process is also called "a diagnosis." Forms of testing commonly performed include blood tests, medical imaging, urinalysis, and biopsy.

EC50: A concentration of a drug that gives a half-maximal response.

Effective amount: An amount of therapeutic agent that is sufficient to generate a desired response, such as reducing or inhibiting one or more signs or symptoms associated with a condition or disease. When administered to a subject, a dosage will generally be used that will achieve target tissue/cell concentrations. In some examples, an "effective amount" is one that treats one or more symptoms and/or underlying causes of any of a disorder or disease. In a representative example, an "effective amount" is a therapeutically effective amount in which the agent alone or with an additional therapeutic agent(s) induces the desired response such as reduction in one or more symptoms associated with cancer.

In particular examples, it is an amount of an agent capable of antagonizing (e.g., blocking) angiotensin receptor activity by at least 10%, at least 20%, at least 50%, at least 60%, at least 70%, at least 80%, at least 90%, at least 95%, at least 98%, or even at least 100%.

In some examples, an effective amount is an amount of a pharmaceutical preparation that alone, or together with a pharmaceutically acceptable carrier or one or more additional therapeutic agents, induces the desired response.

In one example, a desired response is to increase the subject's survival time and/or improve the subject's quality of life, for example by reducing a number and/or amount of symptoms associated with cancer. In another example, a desired response is to increase the subject's survival time and/or improve the subject's quality of life by slowing or eliminating progression of disease, such as slowing or eliminating the progression of cancer.

The symptoms and/or underlying cause of a disease, syndrome, etc., do not need to be completely inhibited for the pharmaceutical preparation to be effective. For example, a pharmaceutical preparation may decrease the progression of the disease, syndrome, etc., by a desired amount, for example by at least 10%, at least 20%, at least 50%, at least 60%, at least 70%, at least 80%, at least 90%, at least 95%, at least 98%, or even at least 100%, as compared to the progression typical in the absence of the pharmaceutical preparation.

In another or additional example, it is an amount sufficient to partially or completely alleviate symptoms of the disease (e.g., cancer) within the subject. Treatment can involve only slowing the progression of the disease temporarily, but can also include halting or reversing the progression of the disease permanently.

Effective amounts of the agents described herein can be determined in many different ways, such as, for example, assaying for a reduction in of one or more signs or symptoms associated with cancer in the subject or measuring the expression level of one or more biological molecules known to be associated with cancer. Effective amounts also can be determined through various in vitro, in vivo or in situ assays, including the assays described herein.

The disclosed therapeutic agents can be administered in a single dose, or in several doses, for example hourly, daily, weekly, monthly, yearly, during a course of treatment. The effective amount can be dependent on the subject being treated, the severity and type of the condition being treated, and the manner of administration.

Hypotension: Refers to low blood pressure, for example a blood pressure less than 90 mm Hg systolic and/or 60 mm Hg diastolic (e.g., 90/60).

Inhibiting a disease or condition: A phrase referring to reducing the development of a disease or condition, for example, in a subject who is at risk for a disease or who has a particular disease (e.g., cancer). Particular methods of the present disclosure provide methods for inhibiting tumor growth in response to cancer, as a representative example.

Luciferase: A generic term for a class of oxidative enzymes that produce bioluminescence. Found naturally in insect fireflies and in luminous marine and terrestrial microorganisms, luciferase is thus a light-producing enzyme. When expressed in mammalian or insect cells, the native signal sequences of these luciferases are functionally active, mediating their export from within the cell to the surrounding culture medium. Bioluminescence assays are conducted using culture media, whereupon the activity of the secreted luciferases provides a readout of the biological signaling event under study.

Maintenance therapy: In the context of cancer treatment, refers to treatment that is given to help keep cancer from coming back in a subject receiving the therapy. Maintenance therapy includes but is not limited to treatment with drugs, vaccines, or antibodies that kill cancer cells, and can be given for an extended period of time (e.g., weeks, months, years).

Mineralocorticoid: Used to describe those actions of adrenal corticosteroids producing sodium and fluid retention and potassium excretion. An example includes aldosterone. Mineralocorticoids bind to and activate mineralocorticoid receptors (MRs).

Optional: "Optional" or "optionally" means that the subsequently described event or circumstance can but need not occur, and that the description includes instances where said event or circumstance occurs and instances where it does not.

Patient: As used herein, the term "patient" includes human and non-human animals. The preferred patient for treatment is a human. "Patient" and "subject" are used interchangeably herein.

Pharmaceutically acceptable carriers: The pharmaceutically acceptable carriers (vehicles) useful in this disclosure are conventional. Remington's Pharmaceutical Sciences, by E. W. Martin, Mack Publishing Co., Easton, Pa., 19th Edition (1995), describes compositions and formulations suitable for pharmaceutical delivery of one or more agents, such as one or more 001 modulatory agents.

In general, the nature of the carrier will depend on the particular mode of administration being employed. For instance, parenteral formulations can include injectable fluids that include pharmaceutically and physiologically acceptable fluids such as water, physiological saline, balanced salt solutions, aqueous dextrose, glycerol or the like as a vehicle. In addition to biologically-neutral carriers, pharmaceutical agents to be administered can contain minor amounts of non-toxic auxiliary substances, such as wetting or emulsifying agents, preservatives, and pH buffering agents and the like, for example sodium acetate or sorbitan monolaurate, sodium lactate, potassium chloride, calcium chloride, and triethanolamine oleate.

Preventing, treating or ameliorating a disease: "Preventing" a disease (such as cancer) refers to inhibiting the full development of a disease. "Treating" refers to a therapeutic intervention that ameliorates a sign or symptom of a disease or pathological condition after it has begun to develop. "Ameliorating" refers to the reduction in the number or severity of signs or symptoms of a disease.

Sample (or biological sample): A biological specimen containing cells, genomic DNA, RNA (including mRNA), protein, or combinations thereof, obtained from a subject. Examples include, but are not limited to, peripheral blood, urine, saliva, tissue biopsy, surgical specimen, and autopsy material. In one example, a sample includes tumor biopsy, such as from a subject with cancer.

Signs or symptoms: Any subjective evidence of disease or of a subject's condition, e.g., such evidence as perceived by the subject; a noticeable change in a subject's condition indicative of some bodily or mental state. A "sign" is any abnormality indicative of disease, discoverable on examination or assessment of a subject. A sign is generally an objective indication of disease. Signs include, but are not limited to, any measurable parameters such as tests for detecting cancer, including but not limited to tumor marker tests of blood, blood protein testing, complete blood count, circulating tumor cell tests, imaging (radiology) tests, endoscopy procedures, biopsy and cytology tests, etc.

In one example, reducing or inhibiting one or more symptoms or signs associated with cancer includes decreasing tumor mass by a desired amount, for example by at least 10%, at least 20%, at least 50%, at least 60%, at least 70%, at least 80%, at least 90%, at least 95%, at least 98%, or even at least 100%, as compared to the activity and/or expression in the absence of the treatment.

Subject: Living multi-cellular vertebrate organisms, a category that includes human and non-human mammals. The term subject is used interchangeably with patient.

Tissue: An aggregate of cells, usually of a particular kind, together with their intercellular substance that form one of the structural materials of an animal and that in animals include connective tissue, epithelium, muscle tissue, and nerve tissue.

Treating a disease: A therapeutic intervention that ameliorates a sign or symptom of a disease or pathological condition including but not limited to cancer, such as a sign or symptom of cancer. Treatment can induce remission or cure of a condition or slowing of its progression. In some instances, treating a disease can include inhibiting the full development of a disease, for example preventing development adverse conditions associated with cancer. Prevention of a disease does not require a total absence of disease. For example, a decrease of at least 50%, or at least 40%, or at least 30%, or at least 20%, or at least 10%, can be sufficient.

Treating a disease can be a reduction in severity of some or all clinical symptoms of the disease or condition, a reduction in the number of relapses of the disease or condition, an improvement in the overall health or well-being of the subject, by other parameters well known in the art that are specific to the particular disease or condition, and combinations of such factors. It may be understood that treating a disease as discussed is not limited to cancer, but also includes, but is not limited to, high blood pressure, neurological disorders (e.g., Alzheimers disease, dementia, cognitive impairment), and others.

Under conditions sufficient for: A phrase that is used to describe any environment that permits the desired activity. One example includes administering a disclosed agent to a subject under conditions sufficient to allow the desired activity. In particular examples, the desired activity is antagonizing one or more of an angiotensin receptors.

III. METHODS OF USE i. Methods of Altering One or More Components of the RAAS to Decrease Tumor Cell Proliferation As discussed herein, a method of altering one or more components of the RAAS in a subject suffering from a condition or disease may comprise administering to the subject an effective amount of one or more of an angiotensin receptor AT2R antagonist for a duration sufficient to elicit a desired response in the subject suffering from the condition or disease. Examples of angiotensin receptor AT2R antagonists include but are not limited to EMA401, PD123319, and/or derivatives thereof.

The effective amount of angiotensin receptor AT2R antagonists (e.g., EMA401 or PD123319) may be selected from a range of about 5 mg/kg/day to 8.5 mg/kg/day, particularly about 5 mg/kg/day, about 5.5 mg/kg/day, about 6 mg/kg/day, about 6.5 mg/kg/day, about 7 mg/kg/day, about 7.5 mg/kg/day, about 8.0 mg/kg/day, or about 8.5 mg/kg/day.

As a particular example, where the angiotensin receptor AT2R antagonist is EMA401, or derivative thereof, the effective amount may be selected from a range of about 5 mg/kg/day to 8.5 mg/kg/day, particularly about 5 mg/kg/day, about 5.1 mg/kg/day, about 5.2 mg/kg/day, about 5.3 mg/kg/day, about 5.4 mg/kg/day, about 5.5 mg/kg/day, about 5.6 mg/kg/day, about 5.7 mg/kg/day, about 5.8 mg/kg/day, about 5.9 mg/kg/day, about 6 mg/kg/day, about 6.1 mg/kg/day, about 6.2 mg/kg/day, about 6.3 mg/kg/day, about 6.4 mg/kg/day, about 6.5 mg/kg/day, about 6.6 mg/kg/day, about 6.7 mg/kg/day, about 6.8 mg/kg/day, about 6.9 mg/kg/day, about 7 mg/kg/day, about 7.1 mg/kg/day, about 7.2 mg/kg/day, about 7.3 mg/kg/day, about 7.4 mg/kg/day, about 7.5 mg/kg/day, about 7.6 mg/kg/day, about 7.7 mg/kg/day, about 7.8 mg/kg/day, about 7.9 mg/kg/day, about 8 mg/kg/day, about 8.1 mg/kg/day, about 8.2 mg/kg/day, about 8.3 mg/kg/day, about 8.4 mg/kg/day, or about 8.5 mg/kg/day. In some examples, the effective amount of EMA401, or derivative thereof, is about 5 mg/kg/day. In some examples, the effective amount of EMA401, or derivative thereof, is about 8.5 mg/kg/day.

As another particular example, where the angiotensin receptor AT2R antagonist is PD123319, or derivative thereof, the effective amount may be selected from a range of about 5 mg/kg/day to 8.5 mg/kg/day, particularly about 5 mg/kg/day, about 5.1 mg/kg/day, about 5.2 mg/kg/day, about 5.3 mg/kg/day, about 5.4 mg/kg/day, about 5.5 mg/kg/day, about 5.6 mg/kg/day, about 5.7 mg/kg/day, about 5.8 mg/kg/day, about 5.9 mg/kg/day, about 6 mg/kg/day, about 6.1 mg/kg/day, about 6.2 mg/kg/day, about 6.3 mg/kg/day, about 6.4 mg/kg/day, about 6.5 mg/kg/day, about 6.6 mg/kg/day, about 6.7 mg/kg/day, about 6.8 mg/kg/day, about 6.9 mg/kg/day, about 7 mg/kg/day, about 7.1 mg/kg/day, about 7.2 mg/kg/day, about 7.3 mg/kg/day, about 7.4 mg/kg/day, about 7.5 mg/kg/day, about 7.6 mg/kg/day, about 7.7 mg/kg/day, about 7.8 mg/kg/day, about 7.9 mg/kg/day, about 8 mg/kg/day, about 8.1 mg/kg/day, about 8.2 mg/kg/day, about 8.3 mg/kg/day, about 8.4 mg/kg/day, or about 8.5 mg/kg/day. In some examples, the effective amount of PD123319, or derivative thereof, is about 5 mg/kg/day. In some examples, the effective amount of PD123319, or derivative thereof, is about 8.5 mg/kg/day.

As discussed herein, a method of altering one or more components of the RAAS in a subject suffering from a condition or disease may further comprise administering to the subject an effective amount of one or more of an angiotensin receptor AT1R antagonist in combination with one or more of an angiotensin receptor AT2R antagonist for a duration sufficient to elicit a desired response in the subject suffering from the condition or disease. Examples of angiotensin receptor AT1R antagonists include but are not limited to Azilsartan (Edarbi), Candesartan (Atacand), Eprosartan, Irbesartan (Avapro), Losartan (Cozaar), Olmesartan (Benicar), Telmisartan (Micardis), Valsartan (Diovan), and/or derivatives thereof.

The effective amount of angiotensin receptor AT1R antagonists (e.g., ARBs) may be selected from a range of about 1.5 mg/kg/day to 6 mg/kg/day, particularly about 1.5 mg/kg/day, about 2 mg/kg/day, about 2.5 mg/kg/day, about 3 mg/kg/day, about 3.5 mg/kg/day, about 4 mg/kg/day, about 4.5 mg/kg/day, about 5 mg/kg/day, or about 5.5 mg/kg/day. In some examples, the effective amount may range from about 1.5 mg/kg/day to about 3.5 mg/kg/day. In some examples, the effective amount may range from about 4 mg/kg/day to about 6 mg/kg/day.

As a particular example, where the angiotensin receptor AT1R antagonist is Losartan, or derivative thereof, the effective amount may be selected from a range of about 4 mg/kg/day to about 6 mg/kg/day, particularly about 4 mg/kg/day, about 4.25 mg/kg/day, about 4.5 mg/kg/day, about 4.75 mg/kg/day, about 5 mg/kg/day, about 5.25 mg/kg/day, about 5.5 mg/kg/day, about about 5.75 mg/kg/day, or about 6 mg/kg/day. In some examples, the effective amount of Losartan, or derivative thereof, is about 5 mg/kg/day.

As another particular example, where the angiotensin receptor AT1R antagonist is Candesartan, or derivative thereof, the effective amount may be selected from a range of about 1.5 mg/kg/day to about 3.5 mg/kg/day, particularly about 1.5 mg/kg/day, about 1.75 mg/kg/day, about 2 mg/kg/day, about 2.25 mg/kg/day, about 2.5 mg/kg/day, about 2.75 mg/kg/day, about 3 mg/kg/day, about 3.25 mg/kg/day, or about 3.5 mg/kg/day. In some examples, the effective amount of Candesartan, or derivative thereof, is about 2.5 mg/kg/day.

The condition or disease may comprise any condition or disease in which the RAAS is implicated. As one example, the condition or disease is cancer. The cancer may be any one of the types of cancers herein disclosed (see "Terms" above). In one representative embodiment, the cancer is pancreatic cancer. In a particular embodiment, the pancreatic cancer is PDA.

The desired response may include a reduction in a sign or symptom associated with the disease or condition, for example a reduction in one or more signs or symptoms associated with cancer (e.g., PDA). In one example, the reduction in the sign or symptom may comprise a reduction in a mass of a tumor associated with the cancer. Specifically, the reduction in the mass of the tumor may be due to a decreased rate of cell proliferation within the tumor mass, as a result of the administering of the effective amount.

The subject may be a human in one example, although in other examples the subject may be a non-human mammal (e.g., dog, cat, horse, etc.) without departing from the scope of this disclosure.

The RAAS is a hormone system that contributes to the regulation of blood pressure and fluid balance. Accordingly, compounds of the present disclosure may have effects on the subject not specific to eliciting the desired response in the subject. Accordingly, the methodology may include monitoring the subject for signs or symptoms of hypotension during the administering. Responsive to an indication of hypotension in the subject, the methodology may include infusing to the subject a salt solution of a determined volume for a determined duration. The composition of the salt solution, determined volume and determined duration may be a function of an extent of the hypotension experienced by the subject. The salt solution may be sodium chloride, for example, or other electrolyte solution capable of alleviating the effects of hypotension in the subject. As a particular example, the salt solution may be sodium chloride at a range of between 100 and 300 milliequivalents in water, the determined volume may be between 350 and 750 mL and the determined duration may be between 1.5 and 3 hours. Additionally or alternatively, responsive to an indication of hypotension, the patient or subject may be placed on a high sodium (greater than or equal to 210 milliequivalents per day) diet via intravenous (IV) or oral (p.o.) administration.

In some examples, the administering may occur prior to, during and/or after following another treatment for the disease or condition. For example, when the disease or condition is cancer (e.g., PDA), the other treatment may include a chemotherapy treatment. The chemotherapy treatment may include one or more of providing to the subject one or more of alkylating agent(s) that do not enter the brain of the subject, alkylating agent(s) capable of entering the brain of the subject, antimetabolite(s), anti-tumor antibiotic(s), topoisomerase inhibitor(s), mitotic inhibitor(s), corticosteroid(s), hormone therapy, and immunotherapy. In some examples, the other treatment may additionally or alternatively comprise radiation treatment.

Examples of alkylating agents relevant to the present disclosure that do not enter the brain include but are not limited to Altretamine, Bendamustine, Busulfan, Carboplatin, Carmustine, Chlorambucil, Cisplatin, Cyclophosphamide, Dacarbazine, Ifosfamide, Lomustine, Mechlorethamine, Melphalan, Oxaliplatin, Temozolomide, Thiotepa, and Trabectedin. Examples of alkylating agents capable of entering the brain include but are not limited to nitrosoureas, for example Carmustine, Lomustine, and Streptozocin.

Examples of antimetabolites relevant to the present disclosure include but are not limited to Azacitidine, 5-fluorouracil (5-FU), 6-mercaptopurine (6-MP), Capecitabine (Xeloda), Cladribine, Clofarabine, Cytarabine (Ara-C), Decitabine, Floxuridine, Fludarabine, Gemcitabine (Gemzar), Hydroxyurea, Methotrexate, Nelarabine, Pemetrexed (Alimta), Pentostatin, Pralatrexate, Thioguanine, and Trifluridine/tipiracil combination.

Examples of anti-tumor antibiotics relevant to the present disclosure include anthracyclines. Anthracyclines may be understood to comprise anti-tumor antibiotics that interfere with enzymes involved in copying DNA during the cell cycle. Specifically, they bind with DNA such that DNA cannot make copies of itself, thereby degrading an ability of a cell to reproduce. Specific examples of anthracyclines relevant to the present disclosure include but are not limited to Daunorubicin, Doxorubicin (Adriamycin), Doxorubicin liposomal, Epirubicin, Idarubicin, Valrubicin. It may be understood that high doses of anthracyclines may have adverse impacts on heart function if given for long periods of time. Accordingly, in some examples lifetime dose limits may be established for such drugs in the context of this disclosure.

Other examples of anti-tumor antibiotics that are not anthracyclines include but are not limited to Bleomycin, Dactinomycin, Mitomycin-C and Mitoxantrone.

Topoisomerase inhibitors may be understood to interfere with enzymes termed topoisomerases, which function to encourage separation of strands of DNA so that the strands may be copied. Topoisomerases may be grouped according to which particular enzyme they affect. Relevant to the present disclosure are Topoisomerase I inhibitors, also termed camptothecins, and Topoisomerase II inhibitors, also termed epipodophyllotoxins. Examples of Topoisomerase I inhibitors relevant to the present disclosure include but are not limited to Irinotecan, Irinotecan liposomal, and Topotecan. Examples of Topoisomerase II inhibitors relevant to the present disclosure include but are not limited to Etoposide (VP-16), Mitoxantrone (also acts as an anti-tumor antibiotic) and Teniposide.

Mitotic inhibitors may be understood to include compounds that work by stopping cells from dividing to form new cells, but can additionally/alternatively adversely impact cells by keeping enzymes from making proteins needed for cell reproduction. Mitotic inhibitors relevant to the present disclosure include taxanes and vinca alkaloids. Taxanes may include but are not limited to Cabazitaxel, Docetaxel, Nab-paclitaxel and Paclitaxel. Vinca alkaloids may include Vinblastine, Vincristine, Vincristine liposomal and Vinorelbine.

Examples of corticosteriods relevant to the present disclosure include but are not limited to prednisone, methylprednisolone, and dexamethasone.

Other chemotherapy drugs relevant to the present disclosure include but are not limited to All-trans-retinoic acid, Arsenic trioxide, Asparaginase, Eribulin, Hydroxyurea, Ixabepilone, Mitotane, Omacetaxine, Pegaspargase, Procarbazine, Romidepsin and Vorinostat.

Examples of hormone therapy relevant to the present disclosure include but are not limited to Abiraterone, Anastrozole, Exemestane, Fulvestrant, Letrozole, Leuprolide and Tamoxifen.

In some examples where the disease or condition is cancer, the administering may be additionally or alternatively used as part of a maintenance therapy regimen. In an embodiment, the effective amount of one or more of the angiotensin receptor antagonists may be higher until there is an indication that the cancer is in remission, and then the effective amount may comprise a lower amount. In other embodiments, the effective amount may be lower until the cancer is in remission, and then the effective amount may be increased. In still other embodiments, the effective amount may be unchanged from prior to the cancer is in remission and after the cancer is in remission. The effective amount, when used as part of maintenance therapy, may be understood to comprise an amount that avoids a recurrence of the cancer, or reduces a likelihood of the cancer, or reduces a rate of regrowth of the cancer (e.g., by 100%, 90%, 80%, 70%, 60%, 50%, 40%, etc.).

As one particular embodiment, it may be understood that the methodology discussed herein may include the use of EMA401 in PDA and other cancers as herein disclosed, alone or in combination with chemotherapy and/or Losartan, Candesartan or other ARBs, at the dosages disclosed herein.

As another particular embodiment, it may be understood that the methodology discussed herein may include the use of PD123319 in PDA and other cancers alone or in combination with chemotherapy and/or Candesartan, Losartan or other ARBs, at the dosages disclosed herein.

As another particular embodiment, it may be understood that the methodology discussed herein may include the use of one or more of angiotensin receptor AT2R antagonist, alone or in combination with one or more of angiotensin receptor AT1R antagonist and/or in combination with chemotherapy, in PDA and other cancers at the dosages herein disclosed.

As another particular embodiment, it may be understood that the methodology discussed herein may include the use of one or more of EMA401 and/or PD123319, alone or in combination with one or more of Losartan, Candesartan, or other ARBs for treatment of PDA and/or maintenance therapy of PDA and other cancers, at the dosages herein disclosed.

For the methodology discussed above, altering one or more components of the RAAS may be understood to comprise reducing activity of one or more of an angiotensin II type 1 receptor and/or angiotensin II type 2 receptor. Reducing activity may be understood to comprise reducing receptor activation which would otherwise occur in the absence of the particular receptor antagonist employed. Reducing activity in the context of this disclosure may comprise reducing activity by 20%, 30%, 40%, 50%, 60%, 70%, 80%, 90% 95%, 99% or even 100%.

For the methodology discussed above, decreasing tumor cell proliferation may comprise reducing a rate at which tumor cells proliferate. Via the administration of the effective amount of the one or more of the angiotensin receptor AT2R antagonist and the angiotensin receptor AT1R antagonist, the rate at which tumor cells proliferate may be reduced by 100%, 99%, 95%, 90%, 85%, 80%, 75%, 70%, 65%, 60%, 55%, 50%, 45%, 40%, 35%, 30%, 25% or in some examples less than 25%. The decrease in tumor cell proliferation as a result of the administering of the effective amount may be understood to result in the eliciting of the desired response in the subject suffering from the condition or disease. In some examples, the desired response may be the reduction in the rate at which tumor cells proliferate. Additionally or alternatively, the desired response may comprise a reduction in one or more other signs or symptoms associated with the condition or disease.

It may be understood that the aspects pertaining to the discussion above with regard to the methods of altering one or more components of the RAAS to decrease tumor cell proliferation may apply to other methods herein disclosed. For example, for brevity, particular dose ranges are not repeated herein for each individual methodology, but the dose ranges disclosed above may be understood to apply to all methods herein discussed. Similarly, particular embodiments discussed above may also apply to other methods, without departing from the scope of this disclosure.

ii. Methods of Treating a Subject Having a Condition/Disorder or Disease that is at Least in Part Regulated by the RAAS In another embodiment, methods are disclosed herein for treating a subject having a condition/disorder or disease that is at least in part regulated by the RAAS. In an example, such a method comprises contacting a cell or cells of the subject with an effective amount of one or more RAAS modulatory agents, the one or more RAAS modulatory agents comprising one or more of an angiotensin receptor AT2R antagonist and an angiotensin receptor AT1R antagonist to alter one or more components of the RAAS, thereby treating the condition/disorder or disease. In this example, it may be understood that contacting the cell or cells may lead to the one or more RAAS modulatory agents ultimately antagonizing one or more of angiotensin receptors (e.g., angiotensin II receptor). For example, by contacting the cell or cells, the RAAS modulatory agent(s) may be internalized whereby the RAAS modulatory agent(s) may antagonize one or more of an angiotensin receptor AT1R and angiotensin receptor AT2R.

In an embodiment, the angiotensin receptor AT2R antagonist may be EMA401, or derivative thereof, or PD123319, or derivative thereof. In an example where the angiotensin receptor AT2R antagonist is EMA401, the effective amount may be selected from a range of about 5 mg/kg/day to about 8.5 mg/kg/day. In an example where the angiotensin receptor AT2R antagonist is PD123319, the effective amount may be selected from a range of about 5 mg/kg/day to about 8.5 mg/kg/day. However, it may be understood that other amounts, such as those discussed above for each of EMA401 and PD123319 (or derivatives thereof), are within the scope of this disclosure.

In an embodiment, the angiotensin receptor AT1R antagonist may be Losartan, or Candesartan (or derivatives thereof). In an example where the angiotensin receptor AT1R antagonist is Losartan, or derivative thereof, the effective amount may be selected from a range of about 4 mg/kg/day to about 6 mg/kg/day. In an example where the angiotensin receptor AT1R antagonist is Candesartan, the effective amount may be selected from a range of about 1.5 mg/kg/day to about 3.5 mg/kg/day. However, it may be understood that other amounts, such as those discussed above for each of Losartan and Candesartan (or derivatives thereof), are within the scope of this disclosure. For instance, in some examples where the angiotensin receptor AT1R antagonist is Losartan, the effective amount may be about 5 mg/kg/day. In some examples where the angiotensin receptor AT1R antagonist is Candesartan, the effective amount may be about 2.5 mg/kg/day.

In an embodiment, the condition or disease may be cancer. The cancer may be one of the cancers discussed above (see "Terms"), provided that the cancer is at least partly regulated by the RAAS. In one embodiment the cancer is a pancreatic cancer. In a particular embodiment, the pancreatic cancer is PDA.

Treating the disease may be understood to comprise reducing one or more signs or symptoms associated with the condition or disease. For example, where the condition or disease is cancer (e.g., PDA), reducing one or more signs or symptoms may in some examples comprise an indication of a decrease in a mass of a tumor associated with the cancer. In another example, reducing one or more signs or symptoms may comprise an indication of a decrease in a rate of growth of the tumor, as compared to an expected or predicted rate of growth in absence of the treatment. Additionally or alternatively, reducing signs or symptoms may comprise reducing physical signs or symptoms associated with the disease, including but not limited to fatigue, lumps, weight changes, skin changes, changes in bowel or bladder habits, persistent cough or trouble breathing, swallowing difficulties, hoarseness, persistent indigestion or discomfort after eating, persistent unexplained muscle or joint pain, persistent, unexplained fevers or night sweats, unexplained bleeding or bruising, etc. Additionally or alternatively, reducing signs or symptoms may comprise a reduction in one or more measurable parameters such as indicated by tests for detecting cancer. For example, tests for detecting cancer may be used to indicate a reduction in signs or symptoms associated with cancer. Tests may include tumor marker tests of blood, blood protein tests, complete blood count tests, circulating tumor cell tests, imaging tests, endoscopy procedures, biopsy and cytology tests, etc.

Treating the subject in an embodiment may include monitoring the subject for signs of hypotension, and responsive to an indication of hypotension, infusing to the subject a salt solution of a determined volume for a determined duration. The salt solution may comprise sodium chloride or other relevant electrolyte solution. The salt solution may be in a range of 150-300 milliequivalents of water, the determined volume may be between 350 and 750 mL, and the determined duration may be between 1.5 and 3 hours. Additionally or alternatively, responsive to an indication of hypotension, the patient or subject may be placed on a high sodium (greater than or equal to 210 milliequivalents per day) diet via intravenous (IV) or oral (p.o.) administration.

In some embodiments the administering may occur prior, during and/or following a chemotherapy treatment. In an example, the chemotherapy treatment may include providing to the subject one or more of alkylating agent(s) that do not enter the brain of the subject, alkylating agent(s) capable of entering the brain of the subject, antimetabolite(s), antitumor antibiotic(s), topoisomerase inhibitor(s), mitotic inhibitor(s), corticosteroid(s), hormone therapy, and immunotherapy. Relevant examples of such treatments include those discussed in greater detail above. In some embodiments, the administering may be part of a maintenance therapy regimen, in addition to or alternative to a primary therapy regimen.

iii. Methods of Treating a Subject Suffering from Pancreatic Cancer

In an embodiment, a method of treating a subject suffering from pancreatic cancer comprises administering to the subject an effective amount of one or more of an angiotensin receptor AT2R antagonist and an angiotensin receptor AT1R antagonist for a duration sufficient to elicit a desired response in the subject suffering from pancreatic cancer. In a particular example, the pancreatic cancer is PDA.

The angiotensin receptor AT2R antagonist may comprise EMA401 or PD123319, or derivatives thereof. Where the angiotensin receptor AT2R antagonist is EMA401, the effective amount may be selected from a range of 5 mg/kg/day to 8.3 mg/kg/day. Where the angiotensin receptor AT2R antagonist is PD123319, the effective amount may be selected from a range of 5 mg/kg/day to 8.3 mg/kg/day. However, it may be understood that other amounts of each compound are within the scope of this disclosure, such as those other amounts discussed in greater detail above. Furthermore, other angiotensin receptor antagonists such as those discussed above, are within the scope of this disclosure. The angiotensin receptor AT1R antagonist may comprise Losartan or Candesartan, or derivatives thereof. In an example where the angiotensin receptor AT1R antagonist is Losartan, the effective amount may be selected from a range of about 4 mg/kg/day to about 6 mg/kg/day. In an example where the angiotensin receptor AT1R antagonist is Candesartan, the effective amount may be selected from a range of about 1.5 mg/kg/day to about 3.5 mg/kg/day. In some embodiments, where the angiotensin receptor AT1R antagonist is Losartan, the effective amount may be about 5 mg/kg/day. In some embodiments, where the angiotensin receptor AT1R antagonist is Candesartan, the effective amount may be about 2.5 mg/kg/day. It may be understood that other amounts for Losartan and Candesartan are within the scope of this disclosure, for example the other amounts discussed in greater detail above.

In embodiments, the desired response is a reduction in one or more signs or symptoms associated with the pancreatic cancer. In examples, such signs or symptoms can include but are not limited to pain in abdomen or middle back, fluid in the abdomen, nausea, fatigue, loss of appetite, dark urine, weight loss, jaundice and related symptoms, gallbladder or liver enlargement, blood clots, diabetes, etc.

In embodiments, reducing signs or symptoms may comprise a reduction in one or more measurable parameters such as indicated by tests for detecting pancreatic cancer. Tests may include tumor marker tests of blood, blood protein tests, complete blood count tests, circulating tumor cell tests, imaging tests, endoscopy procedures, biopsy and cytology tests, etc.

In an embodiment, the desired response is a reduction in a rate at which the pancreatic cancer grows over time. In other words, a reduction in a rate at which cells of the pancreatic cancer proliferate. Thus, the effective amount may reduce a rate of tumor cell proliferation by 100%, 99%, 95%, 90%, 85%, 80%, 75%, 70%, 65%, 60%, 55%, 50%, 45%, 40%, 35%, 30%, 25%, or even less than 25% in some examples, as compared to the rate of tumor cell proliferation in absence of the effective amount of one or more of an angiotensin receptor antagonists. In some additional or alternative examples, the desired response is a decrease in a mass of a tumor of the pancreatic cancer, as compared to mass of the tumor in absence of the effective amount of one or more of an angiotensin receptor antagonists.

In an embodiment, the effective amount may be adjusted over the course of treating the subject. For example, the effective amount may be administered at a first dosage for a first duration, and may then be administered at a second dosage for a second duration. In some examples the effective amount may be further modified, such as a third dosage for a third duration, a fourth dosage for a fourth duration, and so on. The effective amount may be a function, in some examples, of one or more signs or symptoms associated with the pancreatic cancer. For example, the effective amount may be changed (e.g., reduced) as one or more signs or symptoms are correspondingly reduced. In other examples the effective amount may not be changed, even as the reduction in one or more signs or symptoms occurs, until the pancreatic cancer is in remission.

In an embodiment, the method may include monitoring the subject suffering from pancreatic cancer for signs of hypotension during the administering of the effective amount. In an embodiment, responsive to an indication of hypotension, the method may include infusing to the subject a salt solution of a determined volume for a determined duration. The salt solution may comprise sodium chloride or other electrolyte solution at 200 milliequivalents in water. The determined volume may be between 350 and 750 mL, and the determined duration may be between 1.5 hours and 3 hours. Additionally or alternatively, responsive to an indication of hypotension, the patient or subject may be placed on a high sodium (greater than or equal to 210 milliequivalents per day) diet via intravenous (IV) or oral (p.o.) administration.

In an embodiment, the administering may occur prior, during and/or following another chemotherapy treatment. The chemotherapy treatment may include providing to the subject one or more of alkylating agent(s) that do not enter the brain of the subject, alkylating agent(s) capable of entering the brain of the subject, antimetabolite(s), anti-tumor antibiotic(s), topoisomerase inhibitor(s), mitotic inhibitor(s), corticosteroid(s), hormone therapy, and immunotherapy. Relevant examples of such treatments are discussed in greater detail above and apply to the presently discussed methodology.

In an embodiment, the administering may be part of a primary pancreatic cancer treatment, or may solely comprise the primary pancreatic cancer treatment. Discussed herein, a primary cancer treatment may comprise treatment upon determining the subject has cancer, for example pancreatic cancer. A secondary treatment may comprise treatment once the cancer is in remission, thus the secondary treatment may comprise a maintenance therapy. Thus, in an embodiment, the administering may additionally or alternatively be a part of a maintenance therapy regimen. The effective amount may differ between a primary treatment and a secondary treatment. For example, the effective amount may comprise a higher dosage during the primary treatment and a lower dosage during the secondary treatment, or vice versa.

IV. ADMINISTRATION OF AN EFFECTIVE AMOUNT OF ONE OR MORE RAAS MODULATORY AGENTS

For any of the disclosed methods, an effective amount of the RAAS modulatory agent is one when administered by a particular route and concentration induces the desired response, which may include reducing or inhibiting one or more signs or symptoms associated with a condition or disease including but not limited to cancer, for example PDA.

i. Administration Routes, Formulations and Concentrations

Methods of administration of the disclosed RAAS modulatory agents are routine, and can be determined by a skilled clinician. The disclosed RAAS modulatory agents or other therapeutic substance are in general administered topically, nasally, intravenously, orally, intracranially, intramuscularly, parenterally or as implants, but even rectal or vaginal use is possible in principle. The disclosed RAAS modulatory agents also may be administered to a subject using a combination of these techniques.

Suitable solid or liquid pharmaceutical preparation forms are, for example, aerosols, (micro)capsules, creams, drops, drops or injectable solution in ampoule form, emulsions, granules, powders, suppositories, suspensions, syrups, tablets, coated tablets, and also preparations with protracted release of active compounds, in whose preparation excipients and additives and/or auxiliaries such as binders, coating agents, disintegrants, flavorings, lubricants, solubilizers, sweeteners, or swelling agents are customarily used as described above. The pharmaceutical agents are suitable for use in a variety of drug delivery systems. For a brief review of various methods for drug delivery, see Langer, "New Methods of Drug Delivery," *Science* 249:1527-1533 (1990), incorporated by reference herein to the extent not inconsistent with the present disclosure.

The disclosed RAAS modulatory agents or other therapeutic agents of the present disclosure can be formulated into therapeutically-active pharmaceutical agents that can be administered to a subject parenterally or orally. Parenteral administration routes include, but are not limited to epidermal, intraarterial, intramuscular (IM and depot IM), intraperitoneal (IP), intravenous (IV), intrasternal injection or infusion techniques, intranasal (inhalation), intrathecal, injection into the stomach, subcutaneous injections (subcutaneous (SQ and depot SQ), transdermal, topical, and ophthalmic.

The disclosed RAAS modulatory agents or other therapeutic agents can be mixed or combined with a suitable pharmaceutically acceptable excipients to prepare pharmaceutical agents. Pharmaceutically acceptable excipients include, but are not limited to, alumina, aluminum stearate, buffers (such as phosphates), glycine, ion exchangers (such as to help control release of charged substances), lecithin, partial glyceride mixtures of saturated vegetable fatty acids, potassium sorbate, serum proteins (such as human serum albumin), sorbic acid, water, salts or electrolytes such as cellulose-based substances, colloidal silica, disodium hydrogen phosphate, magnesium trisilicate, polyacrylates, polyalkylene glycols, such as polyethylene glycol, polyethylene-polyoxypropylene-block polymers, polyvinyl pyrrolidone, potassium hydrogen phosphate, protamine sulfate, group 1 halide salts such as sodium chloride, sodium carboxymethylcellulose, waxes, wool fat, and zinc salts, for example. Liposomal suspensions may also be suitable as pharmaceutically acceptable carriers.

Upon mixing or addition of one or more disclosed RAAS modulatory agents and/or or other therapeutic agents, the resulting mixture may be a solid, solution, suspension, emulsion, or the like. These may be prepared according to methods known to those of ordinary skill in the art. The form of the resulting mixture depends upon a number of factors, including the intended mode of administration and the solubility of the agent in the selected carrier. Pharmaceutical carriers suitable for administration of the disclosed RAAS modulatory agents or other therapeutic agents include any such carriers known to be suitable for the particular mode of administration. In addition, the disclosed RAAS modulatory agents or other therapeutic substance can also be mixed with other inactive or active materials that do not impair the desired action, or with materials that supplement the desired action, or have another action.

Methods for solubilizing may be used where the agents exhibit insufficient solubility in a carrier. Such methods are known and include, but are not limited to, dissolution in aqueous sodium bicarbonate, using cosolvents such as dimethylsulfoxide (DMSO), and using surfactants such as TWEEN® (ICI Americas, Inc., Wilmington, Del.).

The disclosed RAAS modulatory agents or other therapeutic agents can be prepared with carriers that protect them against rapid elimination from the body, such as coatings or time-release formulations. Such carriers include controlled release formulations, such as, but not limited to, microencapsulated delivery systems. A disclosed RAAS modulatory agent or other therapeutic agent is included in the pharmaceutically acceptable carrier in an amount sufficient to exert a therapeutically useful effect, typically in an amount to avoid undesired side effects, on the treated subject. The therapeutically effective concentration may be determined empirically by testing the compounds in known in vitro and in vivo model systems for the treated condition. For example, mouse models of cancer (e.g., PDA) or other disease in which the RAAS is implicated may be used to determine effective amounts or concentrations that can then be translated to other subjects, such as humans, as known in the art.

Injectable solutions or suspensions can be formulated, using suitable non-toxic, parenterally-acceptable diluents or solvents, such as 1,3-butanediol, isotonic sodium chloride solution, mannitol, Ringer's solution, saline solution, or water; or suitable dispersing or wetting and suspending agents, such as sterile, bland, fixed oils, including synthetic mono- or diglycerides, and fatty acids, including oleic acid; a naturally occurring vegetable oil such as coconut oil, cottonseed oil, peanut oil, sesame oil, and the like; glycerine; polyethylene glycol; propylene glycol; or other synthetic solvent; antimicrobial agents such as benzyl alcohol and methyl parabens; antioxidants such as ascorbic acid and sodium bisulfate; buffers such as acetates, citrates, and phosphates; chelating agents such as ethylenediaminetetraacetic acid (EDTA); agents for the adjustment of tonicity such as sodium chloride and dextrose; and combinations thereof. Parenteral preparations can be enclosed in ampoules, disposable syringes, or multiple dose vials made of glass, plastic, or other suitable material. Buffers, preservatives, antioxidants, and the like can be incorporated as required. Where administered intravenously, suitable carriers include physiological saline, phosphate-buffered saline (PBS), and solutions containing thickening and solubilizing agents such as glucose, polyethylene glycol, polypropyleneglycol, and mixtures thereof. Liposomal suspensions, including tissue-targeted liposomes, may also be suitable as pharmaceutically acceptable carriers.

If the disclosed RAAS modulatory agent, or other therapeutic agent is administered orally as a suspension, the pharmaceutical agents can be prepared according to techniques well known in the art of pharmaceutical formulation and may contain a suspending agent, such as alginic acid or sodium alginate, bulking agent, such as microcrystalline cellulose, a viscosity enhancer, such as methylcellulose, and sweeteners/flavoring agents. Oral liquid preparations can contain conventional additives such as suspending agents, e.g., gelatin, glucose syrup, hydrogenated edible fats, methyl cellulose, sorbitol, and syrup; emulsifying agents, e.g., acacia, lecithin, or sorbitan monooleate; non-aqueous carriers (including edible oils), e.g., almond oil, fractionated coconut oil, oily esters such as glycerine, propylene glycol, or ethyl alcohol; preservatives such as methyl or propyl p-hydroxybenzoate or sorbic acid; and, if desired, conventional flavoring or coloring agents. When formulated as immediate release tablets, these agents can contain dicalcium phosphate, lactose, magnesium stearate, microcrystalline cellulose, and starch and/or other binders, diluents, disintegrants, excipients, extenders, and lubricants.

If oral administration is desired, one or more disclosed RAAS modulatory agents, or other therapeutic substances, can be provided in a composition that protects it from the acidic environment of the stomach. For example, the disclosed RAAS modulatory agents or other therapeutic agents can be formulated with an enteric coating that maintains its integrity in the stomach and releases the active compound in the intestine. The disclosed RAAS modulatory agents, or other therapeutic agent can also be formulated in combination with an antacid or other such ingredient.

Oral compositions generally include an inert diluent or an edible carrier and can be compressed into tablets or enclosed in gelatin capsules. For the purpose of oral therapeutic administration, one or more of the disclosed RAAS modulatory agents, or other therapeutic substances can be incorporated with excipients and used in the form of capsules, tablets, or troches. Pharmaceutically compatible adjuvant materials or binding agents can be included as part of the composition.

The capsules, pills, tablets, troches, and the like can contain any of the following ingredients or compounds of a similar nature: a binder such as, but not limited to, acacia, corn starch, gelatin, gum tragacanth, polyvinylpyrrolidone, or sorbitol; a filler such as calcium phosphate, glycine, lactose, microcrystalline cellulose, or starch; a disintegrating agent such as, but not limited to, alginic acid and corn starch; a lubricant such as, but not limited to, magnesium stearate, polyethylene glycol, silica, or talc; a gildant, such as, but not limited to, colloidal silicon dioxide; a sweetening agent such as sucrose or saccharin; disintegrants such as potato starch; dispersing or wetting agents such as sodium lauryl sulfate; and a flavoring agent such as peppermint, methyl salicylate, or fruit flavoring.

When the dosage unit form is a capsule, it can contain, in addition to material of the above type, a liquid carrier, such as a fatty oil. In addition, dosage unit forms can contain various other materials that modify the physical form of the dosage unit, for example, coatings of sugar and other enteric agents. One or more of the disclosed RAAS modulatory agents, or other therapeutic agent can also be administered as a component of an elixir, suspension, syrup, wafer, tea, chewing gum, or the like. A syrup may contain, in addition to the active compounds, sucrose or glycerin as a sweetening agent and certain preservatives, dyes and colorings, and flavors.

When administered orally, the compounds can be administered in usual dosage forms for oral administration. These dosage forms include the usual solid unit dosage forms of tablets and capsules as well as liquid dosage forms such as solutions, suspensions, and elixirs. When the solid dosage forms are used, they can be of the sustained release type so that the compounds need to be administered less frequently.

In some implementations, the effective amount of one or more of the disclosed RAAS modulatory agents is administered as a single dose per time period, depending on the application. In one example, the single dose per time period may be every three or four months, month, week, or day, or even less such as a single time point or two or more timepoints within a matter of minutes or hours, or it can be divided into at least two unit dosages for administration over a period. Treatment may be continued as long as necessary to achieve the desired results. In some examples, treatment may continue for about 3 or 4 weeks up to about 12-24 months or longer, including ongoing treatment. The RAAS modulatory agent(s) can also be administered in several doses intermittently, such as every few days (for example, at least about every two, three, four, five, or ten days) or every few weeks (for example at least about every two, three, four, five, or ten weeks).

Particular dosage regimens can be tailored to a particular subject, condition to be treated, or desired result. In one example, an initial treatment regimen may include administering a higher dosage of one or more of the disclosed RAAS modulatory agents, or administering such material more frequently as compared to later times of treatment. After a desired therapeutic result has been obtained, a second treatment regimen may be applied, such as administering a lower dosage of one or more of the disclosed RAAS modulatory agents or administering such material less frequently, such as monthly, bi-monthly, quarterly, or semi-annually. In some examples, the second regimen may serve as a "booster", for example. Alternatively, an initial treatment may include administering a lower dosage followed by a second treatment of a higher dosage.

Amounts effective for various therapeutic treatments of the present disclosure may, of course, depend on the severity of the disease and the weight and general state of the subject, as well as the absorption, inactivation, and excretion rates of the therapeutically-active compound or component, the dosage schedule, and amount administered, as well as other factors known to those of ordinary skill in the art. It also should be apparent to one of ordinary skill in the art that the exact dosage and frequency of administration will depend on the particular RAAS modulatory agent, or other therapeutic substance being administered, the particular condition being treated, the severity of the condition being treated, the age, weight, general physical condition of the particular subject, and other medication the subject may be taking. Typically, dosages used in vitro may provide useful guidance in the amounts useful for in vivo administration of the pharmaceutical composition, and animal models may be used to determine effective dosages for treatment of particular disorders. For example, mouse models of cancer (e.g., PDA) may be used to determine effective dosages that can then be translated to dosage amount for other subjects, such as humans, as known in the art. Various considerations in dosage determination are described, e.g., in Gilman et al., eds., *Goodman And Gilman's: The Pharmacological Bases of Therapeutics,* 8th ed., Pergamon Press (1990); *Remington's Pharmaceutical Sciences,* 17th ed., Mack Publishing Co., Easton, Pa. (1990); and Anroop B. Nair and Shery Jacob. *A simple practice guide for dose conversion between animals and human.* J Basic Clin Pharm. March 2016-May 2016; 7(2): 27-31, each of which is herein incorporated by reference to the extent not inconsistent with the present disclosure. However, it is to be noted that the in vitro dosages are commonly higher than the in vivo dosages that are needed in mice or humans. In particular, AT1R antagonists' in vitro dosages, with respect to the present disclosure, are expected to be markedly higher than the in vivo administration dosages.

ii. Desired Response

One or more disclosed RAAS modulatory agents and/or additional therapeutic agents are administered by a specific route and/or concentration to generate a desired response. In some examples, a desired response refers to an amount effective for lessening, ameliorating, eliminating, preventing, or inhibiting at least one symptom of a disease, disorder, or condition treated and may be empirically determined. In various embodiments of the present disclosure, a desired response is reduction of one or more signs or symptoms associated with cancer (e.g., PDA).

EXAMPLES

The following Examples are put forth so as to provide those of ordinary skill in the art with a complete disclosure and description of how to make and use the methods of the disclosure, and are not intended to limit the scope of what the inventors regard as their disclosure.

Example 1

This Example describes materials and methods used to perform the subsequent Examples.

In Vitro Methods

PDA cell line (PANC-1 or HS766T) or patient cancer cells (PaCa9) were trypsinized with 1% trypsin in Hank's Balanced Salt Solution (HBSS), counted, washed, and resuspended in serum free AIM media (ThermoFisher Scientific, Waltham, MA) or complete Dulbecco's Modified Eagle Medium (DMEM) supplemented with 10% fetal bovine serum, 2 nM glutamine, 100 U/ml of penicillin G, and 100 mg/ml of streptomycin. Cells at a concentration of $2-4 \times 10^4$ cells/well in 100 µl culture medium were seeded in triplicate in 96 well plates, then cultured in a humidified incubator at 37° C. and 5% $CO_2$. On the next day, cell supernatant was discarded and compounds (e.g., drugs) of the present disclosure in 200 µl medium were added with the concentrations indicated in the following Examples. After 72 hours of culture, cell proliferation reagent WST1 (20 µl/well, Sigma Aldrich Inc, St. Louis, MO) were added and plates were read using an ELISA reader at 2 hours and 4 hours under the wavelength of 450 nm. The measured absorbance (OD value) was recorded and graphed and statistically analyzed using GraphPad Prism 8, t-test, or t-test with Bonferroni correction.

In Vivo Methods

All methods described pertaining to animal studies were conducted under the approved guidelines of the Institutional Animal Care and Use Committee (IACUC) of Ochsner Health System and in accordance with animal research guidelines. All patient tumors for this study were collected from consented patients undergoing cancer resection surgeries in line with the Ochsner Health System Investigative Review Board (IRB) and the ethical standards of the Institutional Committee on Human Experimentation. Histological diagnoses were based on microscopic features of carcinoma cells, the histological type, and tumor grade determined by board-certified pathologists.

Human PDCA cell line PANC-1 was transduced with pre-made lentiviral vectors encoding luciferase (firefly)/red fluorescent protein (RFP) to enable monitoring of the growth of primary tumor and metastasis. RFP positive PANC-1 cells were sorted repeatedly using fluorescence-activated cell sorting (FACS) Aria cell sorter (BD, Franklin Lakes, NJ) and enriched to more than 95% purity. For in vivo experiments, Nonobese diabetic/severe combined immunodeficiency-NOD-SCID mice (Jackson Labs, Bar Harbor, ME, or inhouse breeding) were first brought under anesthesia with isoflurane (2.5% in 100% oxygen, 1 L/min) in an induction chamber and maintained under adequate anesthesia (isoflurane inhalation) while being laid on a warming pad throughout the surgical procedure. For tumor generation, $5 \times 10^4$ luciferase-tagged PANC-1 cells were co-inoculated with $3 \times 10^5$ lymph node stromal cell (LNSC) analog HK cells. The mice received a 0.75-1.2 cm long incision (on the left side of the body slightly medial to the splenic silhouette) to exteriorize the spleen and pancreas. While gently retracting the pancreas laterally, a 30 G needle was inserted along the length of the pancreas from the tail to the pancreatic head region. Then, 10 μl of cell suspension was injected as the needle was withdrawn to the mid-body of the pancreas. The needle was removed, and the area was inspected for leakage and bleeding. The pancreas and spleen were internalized with forceps and the abdominal muscle layer was closed with interrupted stitches (3-0 silk suture). The overlying skin was closed with a second set of interrupted stitches. Buprenorphine SR-LAB was injected subcutaneously immediately after the surgery for pain relief.

After the surgery, tumor growth and metastatic tumor burden were monitored and assessed weekly for luciferase activity by bioluminescence imaging (BLI) using Lago Imaging System (Spectral Instruments Imaging, Tucson, AZ). Mice were anesthetized using isoflurane for all imaging procedures. Mice were administered intraperitoneally with luciferin (10 mg/kg) and imaged in 10-20 minutes for maximum luciferase signal plateau. Images were analyzed using Aura Imaging software. Once the BLI levels of xenografted tumor reached $5 \times 10^8$ photons (around 7-9 weeks post PANC-1 cell injection), the mice were grouped based on their BLI level and compounds (e.g., drugs) of the present disclosure were given by gavage daily to each group for 4 weeks. Drugs used were Losartan (60 mg/kg), Candesartan (30 mg/kg), EMA (60 mg/kg), and a combination of EMA (60 mg/kg) with Losartan (60 mg/kg). Upon sacrifice after 4 weeks of treatment, primary tumors and mouse organs were harvested, weighed, imaged, and formalin-fixed for (hematoxylin and eosin) H&E and immunohistochemistry staining. Data was statistically analyzed using t-test, or t-test with Bonferroni correction.

Example 2

AT2R blocker EMA401 is a novel small molecule inhibitor of the angiotensin type 2 receptor (AT2R) that was originally studied in humans for the treatment of neuropathic pain. This Example of the present disclosure demonstrates 1) in vitro proliferative effects of AT2R blocker EMA401 alone, and a combination of AT2R and AT1R blockers on cultured PANC-1 cells in the presence of serum (Table 1), 2) in vitro proliferative effects of AT2R blocker alone, and a combination of AT2R and AT1R blockers on cultured HS766T cells in the presence of serum (Table 2), and 3) in vitro proliferative effects of AT2R blocker alone, and a combination of AT2R and AT1R blockers on PaCa9 patient tumor cells in the presence of serum after 1 hour (Table 3) and 2 hours (Table 4) of incubation. EMA401 herein was tested for each condition at concentrations of 10 μM and 50 μM. DMSO was used to solubilize EMA401. AT1R blockers Candesartan and Losartan were used at a concentration of 10 μM and 100 μM, respectively, in each condition. Losartan was dissolved in phosphate buffered saline. Control refers to absence of drugs. Data is presented as mean, standard deviation, standard error of the mean, and p-value (probability of obtaining test results at least as extreme as the results actually observed, under the assumption that the null hypothesis is correct). NS in this Example and following Examples refers to non-significantly different as compared to control. The mean is representative of three individual experiments for each specified condition.

TABLE 1

Effects of various compounds on PANC-1 cell proliferation (2 h, 10% FCS-DMEM)

| Dosage | mean | Standard deviation | Standard error of the mean | p value |
|---|---|---|---|---|
| Control (N = 3) | 3.618 | 0.145 | 0.084 | n/a |
| EMA 10 μM | 2.976 | 0.568 | 0.323 | 0.131 NS |
| EMA 50 μM | 2.957 | 0.342 | 0.197 | 0.037 |
| Losartan 100 μM | 2.507 | 0.700 | 0.404 | 0.225 |
| EMA 10 μM + Candesartan 10 μM | 3.132 | 0.438 | 0.253 | 0.140 NS |
| EMA 10 μM + Losartan 100 μM | 1.880 | 0.186 | 0.107 | 0.002 |
| EMA 50 μM + Candesartan 10 μM | 2.507 | 0.618 | 0.357 | 0.039 |
| EMA 50 μM + Losartan 100 μM | 1.640 | 0.279 | 0.161 | 0.0004 |

TABLE 2

Effects of various compounds on HS766T cell proliferation (2 h, 10% FCS-DMEM)

| Dosage | mean | Standard deviation | Standard error of the mean | p value |
|---|---|---|---|---|
| Control | 3.214 | 0.400 | 0.231 | n/a |
| EMA 10 μM | 1.360 | 0.331 | 0.191 | 0.0035 |
| EMA 50 μM | 1.41 | 0.204 | 0.118 | 0.0003 |
| Candesartan 10 μM | 2.856 | 0.233 | 0.134 | 0.231 NS |
| Losartan 100 μM | 2.992 | 0.397 | 0.229 | 0.532 NS |
| EMA 10 μM + Candesartan 10 μM | 1.124 | 0.087 | 0.050 | 0.0009 |
| EMA 10 μM + Losartan 100 μM | 0.914 | 0.102 | 0.059 | 0.0006 |
| EMA 50 μM + Candesartan 10 μM | 1.026 | 0.015 | 0.009 | 0.007 |
| EMA 50 μM + Losartan 100 μM | 1.541 | 0.373 | 0.215 | 0.0061 |

TABLE 3

Effects of various compounds on PaCa-9 PDAC patient tumor cell proliferation (1 h, 10% FCS-DMEM)

| Dosage | mean | Standard deviation | Standard error of the mean | p value |
|---|---|---|---|---|
| Medium/DMSO (N = 5) | 3.571 | 0.180 | 0.081 | n/a |
| EMA 10 μM | 2.088 | 0.242 | 0.139 | 0.0001 |
| EMA 50 μM | 2.000 | 0.104 | 0.060 | 0.0001 |
| Candesartan 10 μM | 3.694 | 0.293 | 0.169 | 0.479 NS |
| Losartan 100 μM | 3.392 | 0.295 | 0.170 | 0.318 NS |
| EMA 10 μM + Candesartan 10 μM | 2.203 | 0.213 | 0.123 | 0.002 |
| EMA 10 μM + Losartan 100 μM | 1.743 | 0.120 | 0.069 | 0.0001 |
| EMA 50 μM + Candesartan 10 μM | 1.812 | 0.074 | 0.043 | 0.0001 |
| EMA 50 μM + Losartan 100 μM | 1.594 | 0.106 | 0.061 | 0.001 |

TABLE 4

Effects of various compounds on PaCa-9 PDAC patient tumor cell proliferation (2 h, 10% FCS-DMEM)

| Dosage | mean | Standard deviation | Standard error of the mean | p value |
|---|---|---|---|---|
| Medium/DMSO | >3.60 | >3.60 | >3.60 | n/a |
| EMA 10 μM | 2.910 | 0.177 | 0.102 | 0.0025 |
| EMA 50 μM | 2.447 | 0.129 | 0.074 | 0.0001 |
| EMA 10 μM + Candesartan 10 μM | 2.469 | 0.126 | 0.123 | 0.0001 |
| EMA 10 μM + Losartan 100 μM | 2.037 | 0.165 | 0.095 | 0.0001 |
| EMA 50 μM + Candesartan 10 μM | 2.181 | 0.0156 | 0.090 | 0.0001 |
| EMA 50 μM + Losartan 100 μM | 1.770 | 0.199 | 0.115 | 0.001 |

Example 3

This Example demonstrates in vitro proliferative effects of AT1R and AT2R blockers on cultured PANC-1 cells (Tables 5A-5B), HS766T cells (Tables 6A-6B), and PaCa9 PDAC patient tumor cells (Tables 7A-7B), in the presence of serum. EMA401 was tested for each condition at concentrations of 10 μM and 50 μM. Candesartan and Losartan were used at a concentration of 20 μM and 100 μM, respectively, in each condition. Each well of the cell proliferation assay comprises $2 \times 10^4$ cells per well. Data is presented as mean, standard deviation, standard error of the mean, and p-value. The mean is representative of three individual experiments for each specified condition.

TABLE 5A

Effects of various compounds on PANC-1 cell proliferation (10% FCS-DMEM)

| Dosage | mean | Standard deviation | Standard error of the mean | p value |
|---|---|---|---|---|
| Medium/DMSO | 3.348 | 0.374 | 0.153 | n/a |
| Candesartan 20 μM | 0.612 | 0.029 | 0.012 | 0.0001 |
| Losartan 100 μM (N = 5) | 3.699 | 0.186 | 0.083 | 0.175 NS |
| EMA401 10 μM | 2.872 | 0.324 | 0.132 | 0.040 |
| EMA401 50 μM | 0.691 | 0.034 | 0.014 | 0.0001 |
| EMA401 10 μM + Candesartan 20 μM | 0.491 | 0.028 | 0.011 | 0.0001 |
| EMA401 10 μM + Losartan 100 μM | 2.752 | 0.429 | 0.175 | 0.028 |
| EMA401 50 μM + Candesartan 20 μM | 0.462 | 0.003 | 0.001 | 0.0001 |
| EMA401 50 μM + Losartan 100 μM | 0.653 | 0.042 | 0.017 | 0.0001 |

TABLE 5B

Effects of various compounds on PANC-1 cell proliferation (p values)

| | p value |
|---|---|
| EMA 50 μM vs EMA 50 μM + Candesartan 20 μM | 0.0001 |
| EMA 50 μM vs EMA 50 μM + Losartan 100 μM | 0.115 NS |
| Candesartan 20 μM vs Candesartan 20 μM + EMA 50 μM | 0.0001 |
| Candesartan 20 μM vs Candesartan 20 μM + EMA 10 μM | 0.0001 |
| EMA 10 μM vs Candesartan 20 μM + EMA 10 μM | 0.0001 |

TABLE 6A

Effects of various compounds on HS766T cell proliferation (10% FCS-DMEM)

| Dosage | mean | Standard deviation | Standard error of the mean | p value |
|---|---|---|---|---|
| Control | 3.339 | 0.342 | 0.153 | n/a |
| Candesartan 20 μM | 0.620 | 0.024 | 0.010 | 0.0001 |
| Losartan 100 μM | 3.182 | 0.662 | 0.270 | 0.643 NS |
| EMA401 10 μM | 3.290 | 0.290 | 0.130 | 0.812 NS |
| EMA401 50 μM | 0.593 | 0.040 | 0.016 | 0.0001 |
| EMA401 10 μM + Candesartan 20 μM | 0.522 | 0.019 | 0.008 | 0.0001 |
| EMA401 10 μM + Losartan 100 μM | 3.333 | 0.436 | 0.178 | 0.980 NS |
| EMA401 50 μM + Candesartan 20 μM | 0.470 | 0.008 | 0.003 | 0.0001 |
| EMA401 50 μM + Losartan 100 μM | 0.555 | 0.039 | 0.016 | 0.0001 |

TABLE 6B

Effects of various compounds on HS766T cell proliferation (p values)

| | p value |
|---|---|
| EMA 50 μM vs EMA 50 μM + Candesartan 20 μM | 0.0001 |
| EMA 50 μM vs EMA 50 μM + Losartan 100 μM | 0.124 NS |
| Candesartan 20 μM vs Candesartan 20 μM + EMA 50 μM | 0.0001 |
| Candesartan 20 μM vs Candesartan 20 μM + EMA 10 μM | 0.0001 |
| EMA 10 μM vs Candesartan 20 μM + EMA 10 μM | 0.0001 |

TABLE 7A

Effects of various compounds on PaCa-9 PDAC patient tumor cell proliferation (10% FCS-DMEM)

| Dosage | mean | Standard deviation | Standard error of the mean | p value |
|---|---|---|---|---|
| Control | 3.535 | 0.511 | 0.2229 | n/a |
| Candesartan 20 μM | 0.464 | 0.009 | 0.004 | 0.0001 |
| Losartan 100 μM | 3.161 | 0.549 | 0.245 | 0.028 |
| EMA401 10 μM | 3.257 | 0.500 | 0.204 | 0.278 |
| EMA401 50 μM | 0.541 | 0.044 | 0.018 | 0.0001 |
| EMA401 10 μM + Candesartan 20 μM | 0.451 | 0.011 | 0.005 | 0.0001 |
| EMA401 10 μM + Losartan 100 μM | 3.002 | 0.485 | 0.212 | 0.130 |
| EMA401 50 μM + Candesartan 20 μM | 0.464 | 0.039 | 0.018 | 0.0001 |
| EMA401 50 μM + Losartan 100 μM | 0.487 | 0.048 | 0.020 | 0.0001 |

TABLE 7B

Effects of various compounds on PaCa-9 PDAC patient tumor cell proliferation (p values)

| | p value |
|---|---|
| EMA 50 μM vs EMA 50 μM + Candesartan 20 μM | 0.013 |
| EMA 50 μM vs EMA 50 μM + Losartan 100 μM | 0.0725 |
| Candesartan 20 μM vs Candesartan 20 μM + EMA 50 μM | NS |
| Candesartan 20 μM vs Candesartan 20 μM + EMA 10 μM | NS |

Example 4

This Example demonstrates in vitro proliferative effects of AT2R blocker PD123319 on 1) cultured PANC-1 cells in the presence of serum (Tables 8 and 12), 2) cultured HS766T cells in the presence of serum (Tables 9 and 13), 3) cultured PANC-1 cells in the absence of serum (Tables 10 and 14), and 4) cultured HS766T cells in the absence of serum (Tables 11 and 15). PD123319 was tested for each condition at concentrations of 10 μM, 30 μM, and 50 μM. Data is presented as mean, standard deviation, standard error of the mean, and p-value. The mean is representative of three individual experiments for each specified condition.

TABLE 8

Effects of PD123319 on PANC-1 cell proliferation (2 h, DMEM-10% FCS)

| Dosage | mean | Standard deviation | Standard error of the mean | N | p value |
|---|---|---|---|---|---|
| Control | 3.922 | 0.037 | 0.021 | 3 | n/a |
| 10 μM | 2.724 | 0.744 | 0.430 | 3 | 0.0495 |
| 30 μM | 2.60 | 0.408 | 0.235 | 3 | 0.0029 |
| 50 μM | 1.951 | n/a | n/a | 1 | 0.0005 |

TABLE 9

Effects of PD123319 on HS766T cell proliferation (2 h, DMEM-10% FCS)

| Dosage | mean | Standard deviation | Standard error of the mean | N | p value |
|---|---|---|---|---|---|
| Control | 2.025 | 0.158 | 0.091 | 3 | n/a |
| 10 μM | 1.336 | 0.023 | 0.133 | 3 | 0.0131 |

TABLE 10

Effects of PD123319 on PANC-1 cell proliferation (2 h, serum free media)

| Dosage | mean | Standard deviation | Standard error of the mean | N | p value |
|---|---|---|---|---|---|
| Control | 3.443 | 0.249 | 0.144 | 3 | n/a |
| 10 μM | 2.120 | 0.806 | 0.466 | 3 | 0.0480 |
| 30 μM | 1.970 | 0.717 | 0.414 | 3 | 0.0254 |
| 50 μM | 2.146 | 0.998 | 0.547 | 3 | 0.0760 |

TABLE 11

Effects of PD123319 on HS766T cell proliferation (2 h, serum free media)

| Dosage | mean | Standard deviation | Standard error of the mean | N | p value |
|---|---|---|---|---|---|
| Control | 2.0695 | 0.30335 | 0.21450 | 2 | n/a |
| 10 μM | 1.23967 | 0.18272 | 0.10549 | 3 | 0.0289 |
| 30 μM | 1.39667 | 0.09961 | 0.05751 | 3 | 0.0316 |
| 50 μM | 1.23467 | 0.38735 | 0.22364 | 3 | 0.0855 |

TABLE 12

Effects of PD123319 on PANC-1 cell proliferation (2 h, 10% FCS DMEM)

| Dosage | mean | Standard deviation | Standard error of the mean | N | p value |
|---|---|---|---|---|---|
| Control | 3.37 | 0.2224 | 0.09078 | 6 | n/a |
| 10 μM | 2.823 | 0.4086 | 0.1668 | 6 | 0.0164 |
| 30 μM | 2.854 | 0.1746 | 0.07129 | 6 | 0.0012 |
| 50 μM | 2.873 | 0.4609 | 0.1882 | 6 | 0.0386 |

TABLE 13

Effects of PD123319 on HS766T cell proliferation (2 h, 10% FCS DMEM)

| Dosage | mean | Standard deviation | Standard error of the mean | N | p value |
|---|---|---|---|---|---|
| Control | 2.913 | 0.7337 | 0.2995 | 6 | n/a |
| 10 μM | 2.895 | 0.3856 | 0.1574 | 6 | 0.9594 |
| 30 μM | 2.555 | 0.1506 | 0.07532 | 4 | 0.3728 |
| 50 μM | 1.886 | 0.3557 | 0.1591 | 5 | 0.0303 |

TABLE 14

Effects of PD123319 on PANC-1 cell proliferation (2 h, serum free media)

| Dosage | mean | Standard deviation | Standard error of the mean | N | p value |
|---|---|---|---|---|---|
| Control | 1.208 | 0.1559 | 0.06364 | 6 | n/a |
| 10 μM | 1.048 | 0.111 | 0.04532 | 6 | 0.0677 |
| 30 μM | 0.7668 | 0.08985 | 0.03668 | 6 | 0.0001 |
| 50 μM | 0.728 | 0.06793 | 0.02773 | 6 | 0.0001 |

TABLE 15

Effects of PD123319 on HS766T cell proliferation (2 h, serum free media)

| Dosage | mean | Standard deviation | Standard error of the mean | N | p value |
|---|---|---|---|---|---|
| Control | 1.906 | 0.1619 | 0.06611 | 6 | n/a |
| 10 μM | 1.708 | 0.193 | 0.07879 | 6 | 0.0842 |
| 30 μM | 1.56 | 0.2953 | 0.1205 | 6 | 0.0306 |
| 50 μM | 1.154 | 0.3075 | 0.1255 | 6 | 0.0004 |

Discussion of Dosages Used in Examples 2-4

In each of the studies, candesartan 10 μM and losartan 100 μM were run and were found to produce no statistical change in cellular proliferation. These doses were chosen based on prior studies that did not produce a statistically significant reduction in PDCA cell proliferation. DMSO was used to solubilize EMA401. Losartan was dissolved in phosphate buffered saline. Extensive data demonstrated that DMSO/DMEM at a small concentrations of DMSO employed had no effect on studies of cell proliferation compared to DMEM and either could serve as a control.

Regarding Candesartan, 20 μM concentration is approximately 20 times the plasma concentration achieved therapeutically in patients following 32 mg/day administration. Candesartan has been used clinically at 128 mg/day, and so 20 μM in culture equates to about 5 times the concentration produced by this higher dose, while 10 μM equates to 2.5 times (Burgess B, et al., J Am Soc Nephrol, 2009; 20(4): 893-900).

Regarding Losartan, 100 μM losartan concentration is about 12 times the concentration produced by the maximum clinical human dose of 200 mg, although it must be noted that in vivo losartan is metabolized into a variety of active moieties not duplicated in tissue culture.

PD123319, an experimental non-peptide AT2R blocker which is not in clinical use but has been administered to human subjects previously (Blankley C J, et al., J Med Chem. 1991; 34(11):3248-60). In the current study, PD123319 has been shown to inhibit PDCA cell proliferation in vitro at concentrations of 10 μM, 30 μM, and 50 μM.

Summary of Experimental Findings in Examples 2-4

For this summary the term "effective" implies a statistically significant ($p<0.05$) decrease in cell proliferation as measured by WST1 assay. In vitro inhibition of PDCA cell proliferation by the AT2R blocker (EMA401) was observed. EMA401 was found to be effective in all cell lines tested at close to clinically used concentration (10 μM).

A synergy was found between EMA401 and ARBs (the concentration of the latter ineffective by design). The use of EMA401, or other AT2R blocker, could potentially work directly or could also permit the use of ARBs at doses closer to those commonly used. The fractional reduction of synergy by drug combination is generally greater than sequential fractional lowering by each drug. The concentrations of EMA401 at 10 μM and 50 μM were found to be effective. Synergy was shown between EMA401 and the ARB candesartan and possibly losartan. Specifically, in vitro there is synergy between EMA401 and losartan, and between EMA401 and candesartan.

Candesartan was found to be effective at 20 μM in PANC-1 cells, Hs766T cells, and PaCa9 cells in this study. Therefore, the minimum effective candesartan dose is close to 20 μM.

PD123319 was found to be effective in inhibiting PDCA cell proliferation in vitro at concentrations of 10 μM, 30 μM, and 50 μM. PD123319 data demonstrates that suppression of PDCA proliferation, in the presence or absence of serum, is a general property of AT2R blockers and not unique to EMA401.

It should be understood that these studies were conducted in two PDA cell lines (PANC-1 and HS766T) and cancer patient cells (PaCa9), thus indicating wide applicability of the findings.

Example 5

This Example demonstrates in vivo effects of the administration of AT2R blocker EMA401 of the present disclosure on tumor weight in mice. Specifically, Tables 17A-17C depict tumor weights from mice treated with control or EMA401 at 100 mg/kg/day for 8.5 weeks. Table 16 represents tumor burden as assessed by BLI after administration of 100 mg/kg EMA401 for 8 weeks. DWK stands for drug week. For each of Table 17B and Table 17C, data is presented as mean, standard deviation, standard error of the mean, and p-value. The mean represents the mean of the number of experiments specified for each condition at each of Table 17B and Table 17C. No drug-related toxicity was observed in any of the in vivo experiments pertaining to the data depicted at Table 16 and Tables 17A-17C.

TABLE 16

Tumor burden assessed by BLI after administration of 100 mg/kg EMA401

| DWK 0.5 | DWK 1.5 | DWK 2.5 | DWK 3.5 | DWK 4.5 CONTROL | DWK 5.5 | DWK 6.5 | DWK 7.5 | DWK 8.5 |
|---|---|---|---|---|---|---|---|---|
| BLI($\times 10^9$) 9814750 N = 20 | BLI ($\times 10^9$) 39174500 N = 20 | BLI ($\times 10^9$) 111343500 N = 20 | BLI ($\times 10^9$) 224215000 N = 20 | BLI ($\times 10^9$) 352744500 N = 20 EMA401 | BLI ($\times 10^9$) 718333333 N = 18 | BLI ($\times 10^9$) 664555556 N = 18 | BLI ($\times 10^9$) 126316667 N = 18 | BLI ($\times 10^9$) 1325411765 N = 17 |
| BLI($\times 10^9$) 7107450 p = 0.455 | BLI ($\times 10^9$) 26194400 p = 0.3038 | BLI ($\times 10^9$) 53428500 p = 0.0419 | BLI ($\times 10^9$) 139193000 p = 0.1193 | BLI ($\times 10^9$) 202146500 p = 0.1032 | BLI ($\times 10^9$) 381163500 p = 0.0516 | BLI ($\times 10^9$) 414773500 p = 0.0458 | BLI ($\times 10^9$) 619455249 p = 0.0074 | BLI ($\times 10^9$) 573307365 p = 0.0025 |

TABLE 17A

Tumor weight (g) from mice treated with control or 100 mg/kg EMA401(DWK 8.5)

| CONTROL | | EMA401 | |
|---|---|---|---|
| 0.9444 | 0.9444 | 0.7215 | 0.6174 (Excluding one outlier) |
| N = 18 | N = 18 | N = 19 | N = 19 |
| n/a | n/a | p = 0.2305 | p = 0.036 |

TABLE 17B

Tumor weight (g) from mice treated with control or 100 mg/kg EMA401(DWK 8.5)

| CONTROL | | | | EMA401 | | | |
|---|---|---|---|---|---|---|---|
| mean | standard deviation | standard error of the mean | N | mean | standard deviation | standard error of the mean | N |
| 0.8041 | 0.4590 | 0.1112 | 17 | 0.5383 | 0.2446 | 0.0577 | 18 |

P = 0.0386

TABLE 17C

| | CONTROL | | | | EMA401 | | |
|---|---|---|---|---|---|---|---|
| mean | standard deviation | standard error of the mean | N | mean | standard deviation | standard error of the mean | N |
| 0.8763 | 0.4794 | 0.0810 | 35 | 0.6347 | 0.4781 | 0.0776 | 38 |

Tumor weight (g) from mice treated with control or 100 mg/kg EMA401(DWK 8.5)

P = 0.0347

Example 6

This Example demonstrates in vivo effects of the administration of various compounds of the present disclosure on tumor weight in mice. Specifically, Table 18 depicts BLI data/tumor weights from mice treated with saline, EMA401 (100 or 60 mg/kg), Losartan (60 mg/kg), or Candesartan (30 mg/kg). BLI was measured at 3.5 weeks of therapy. BLI and tumor weight were measured at 4 weeks of therapy. Thus, Table 18 represents a short term low-dose study. Specifically, for the 4 week study, compounds tested included EMA401 (60 mg/kg), EMA401 (100 mg/kg), Candesartan (30 mg/kg), Losartan (60 mg/kg), a combination of Losartan (60 mg/kg) and EMA401 (60 mg/kg), and a combination of Candesartan (30 mg/kg) and EMA401 (60 mg/kg). For Table 18, data is presented as mean, standard deviation, standard error of the mean, and p-value. The mean represents the mean of the number of experiments specified for each condition at Table 18. No drug-related toxicity was observed in any of the in vivo experiments pertaining to the data depicted at Table 18.

TABLE 18

BLI data from mice treated with various compounds for four weeks

| Dosage | mean | Standard deviation | Standard error of the mean | p value | % of control |
|---|---|---|---|---|---|
| Control (N = 18) | 3.003 | 2.754 | 0.644 | n/a | 100% |
| EMA (60 mg/kg) + Losartan (60 mg/kg) (N = 20) | 1.030 | 0.971 | 0.271 | 0.0046 * | 34% |
| EMA (60 mg/kg) (N = 20) | 1.782 | 1.842 | 0.412 | 0.112 NS | 59% |
| EMA (100 mg/kg) (N = 18) | 1.834 | 2.382 | 0.561 | 0.180 NS | 61% |
| Losartan (60 mg/kg) (N = 17) | 2.199 | 1.824 | 0.443 | 0.316 NS | 73% |
| Candesartan (30 mg/kg) (N = 18) | 2.016 | 2.628 | 0.6194 | 0.277 NS | 67% |
| EMA (60 mg/kg) + Candesartan (30 mg/kg) (N = 18) | 2.164 | 1.344 | 0.3169 | 0.251 NS | 72% |

If weeks 3.5 and 4 are considered separately, EMA (60 mg/kg)+losartan (60 mg/kg) differs from control at p=0.02 (control 2.48+/−1.98+/−0.663, n=9; drugs 0.7695+/−0.6976+/−0.220 n=10) at 3.5 weeks. At 4 weeks, this drug combination differs from control but only at p=0.08 (control 2.3366+/−1.2799+/−0.4268, n=9; EMA (60 mg/kg)+losartan (60 mg/kg) 1.300+/−1.153+/−0.3648, n=10). If aggregate difference from control over the last week of the trial is determined as above, the drug combination differs from control at p=0.0046.

Example 7

This Example demonstrates in vivo effects of the administration of various compounds of the present disclosure on tumor weight in mice. Specifically, Table 19 depicts tumor weights (in grams) from mice treated with saline, Candesartan Cilexitil (60 mg/kg), Losartan (60 mg/kg), Spironolactone (100 mg/kg), or a combination of Losartan (60 mg/kg) and Spironolactone (100 mg/kg). Tumor weights were measured at 4 weeks of therapy. Thus, Table 19 represents a four-week in vivo study. Specifically, for the 4-week study, compounds tested included Candesartan Cilexitil (60 mg/kg), Spironolactone (100 mg/kg), Losartan (60 mg/kg), and a combination of Losartan (60 mg/kg) and Spironolactone (100 mg/kg). Spironolactone is a mineralocorticoid receptor antagonist. For Table 19, data is presented as mean, standard deviation, standard error of the mean, and p-value. The mean represents the mean of the number of experiments specified for each condition at Table 19. No drug-related toxicity was observed in any of the in vivo experiments pertaining to the data depicted at Table 19.

TABLE 19

Tumor weight (g) from mice treated with various compounds for four weeks

| Dosage | mean | Standard deviation | Standard error of the mean | p value | % of control |
|---|---|---|---|---|---|
| Control (N = 8) | 0.425 | 0.114 | 0.040 | n/a | 100% |
| Candesartan Cilexitil (60 mg/kg) (N = 7) | 0.163 | 0.148 | 0.056 | 0.002 | 38% |

TABLE 19-continued

Tumor weight (g) from mice treated with various compounds for four weeks

| Dosage | mean | Standard deviation | Standard error of the mean | p value | % of control |
|---|---|---|---|---|---|
| Spironolactone (100 mg/kg) (N = 10) | 0.292 | 0.101 | 0.032 | 0.018 | 69% |
| Losartan (60 mg/kg) (N = 8) | 0.3691 | 0.255 | 0.090 | 0.5776 NS | 87% |
| Losartan (60 mg/kg) + Spironolactone (100 mg/kg)(N = 8) | 0.250 | 0.151 | 0.054 | 0.021 | 59% |

Discussion of Dosages Used in Examples 5-7

The 60 mg/kg EMA401 in mice used herein is, based on weight, equivalent to 400 mg/day in an 80 kg man. According to dose equivalents known to those in the art, the mouse dose should be divided by 12.3 to derive the biologically equivalent human dose. Thus, the 100 mg/kg EMA401 in mice is equivalent to 640 mg/day in an 80 kg man. These results are consistent with tissue culture results showing that 10 µM EMA401 is effective, while 400 mg/day EMA401 in humans produces a serum concentration of 8 µM. Thus, effective in vitro concentrations of EMA401, unlike the required concentrations of ATR1 blockers, are not large compared with serum concentrations seen in the clinic. 100 mg EMA401 p.o. in men and women produces a serum concentration=1000 µg/L (mol wt 507.6)=2 µM. Therefore, 400 mg can produce 8 µM, slightly less than the 10 µM shown here to be effective in vitro. Thus, 600 mg/day p.o. would produce 12 µM. According to the results shown in the present disclosure, EMA401 is active against PDCA at 10 to 50 µM in cell culture. Moreover, various other AT2R blockers are active in different conditions at low doses. For example, PD123319 is active in rats at a dose of 0.1 mg/kg by subcutaneous injection. Thus, based on the in vitro concentrations and the in vivo dosing shown here are effective against PDCA. AT2R blockers (such as EMA401 and PD123319), unlike AT1R blockers, are likely therapeutically active at concentrations/doses easily achievable in man. Unlike AT1R blockers, EMA401 and likely other AT2R blockers, reach serum concentrations in humans equal to concentrations active against PDCA cells in culture.

The 30 mg/kg candesartan dose is equivalent to 200 mg/day in an 80 kg man. The usual maximum dose of candesartan for high blood pressure is 32 mg/day, but 128 mg/day has safely and effectively been used long term in patients in order to reduce renal protein excretion; candesartan has also been safely used at comparably high doses in mice. Candesartan cilexetil has been orally administered to mice safely for up to 104 weeks at doses up to 100 mg/kg/day.

The 60 mg/kg Losartan dose used here in mice is the biological equivalent of 400 mg/day in an 80 kg man, a dose that is twice the maximum human dose. Should doses this high actually be needed in patients to see synergy with AT2R blockers, it is important to note that the hypotensive effects of renin-angiotensin system blockers can be offset by high salt diet.

The fact that very high drug concentrations are needed to see an anti-proliferative effect in culture, as opposed to the lower doses used to see minor clinical effects in man has been interpreted to mean that the anti-proliferative effect of the drugs are not involved in the minor clinical actions of the drugs on PDCA. We herein disclose that even if the doses of drugs currently used in the clinic act independent of RAAS effects or independent of effects on proliferation, the evidence herein disclosed indicates that the effects of all these drugs are RAAS mediated at higher than customary doses/concentrations. Furthermore, it must be noted that the in vitro systems are complicated by other factors. For example, Losartan and Candesartan are prodrugs. Conversion to active forms may be less in culture than in vivo. And the in vivo hormonal environment may differ from that in culture. Still further, the in vitro experiments were conducted over 3 days, whereas the in vivo studies were conducted over 8 weeks. If long term partial RAAS inhibition produces anti-proliferative effects (for example epigenetic effects), these might only be mimicked by near complete short term RAAS inhibition (requiring very high doses of drugs in short term in vitro experiments). The ARBs and drugs discussed herein are not cell poisons but rather interrupt physiological systems and may take time to effect physiological changes.

Summary of Experimental Findings in Examples 5-7

Tumor burden, as assessed by BLI, decreased significantly after administration of 100 mg/kg EMA401 in PANC-1 tumor orthotopic xenograft mouse model for 8 weeks. Tumor weight fell by 24% but did not reach statistical significance. When one outlier was omitted, tumor weight decreased significantly (p=0.036) by 35%. When the study was repeated, tumor weight fell significantly (p=0.0386). When tumor weights from both studies (including the outlier) were pooled, tumor weights fell significantly (p=0.0347). The end of study body weights of control and EMA401-treated animals were not different. No drug-related toxicity was observed. One control animal died during the study; however, no EMA401-treated animal died.

Thus, EMA401 lowered tumor burden as assessed by BLI at multiple time points to a statistically significant degree. Tumor weight was also reduced but not to a statistically significant degree because of a single outlier. Excluding this outlier rendered the result statistically significant. To confirm the EMA401 effect on tumor weight, the experiment design was repeated. A statistically significant EMA401-induced reduction in tumor weight was shown. When the tumor weights of both studies were pooled (including the outlier) the difference in tumor weight remained statistically significant. This further demonstrates that EMA401 reduces tumor burden and this conclusion is supported by the BLI data.

In the short-term low dose study, EMA401 and losartan synergize to lower BLI. EMA401 60 mg/kg did not reduce tumor weight; the other drugs did reduce tumor weight but not significantly. Therefore, tumor suppression requires higher dose or longer duration therapy or both to produce statistically significant tumor reduction. EMA401 60 mg/kg did synergize with losartan 60 mg/kg to reduce BLI.

EMA 60 mg/kg, EMA 100 mg/kg, Losartan 60 mg/kg, candesartan 30 mg/kg reduced BLI by 25% to 40% but not statistically significantly. The combination of EMA 60 mg/kg and Losartan 60 mg/kg reduced BLI by 65% and this was a statistically significant reduction (p=0.0046). This result demonstrated synergy between EMA401 and Losartan, i.e., the fractional reduction by drug combination is greater than sequential fractional lowering by each drug.

Thus, all drugs lowered BLI and tumor weight after 4 weeks but not significantly, except in the case of the combination of EMA (60 mg/kg) and losartan (60 mg/kg), which significantly lowered BLI. EMA401 and losartan synergized. The duration of therapy appears to be critically important to showing a statistically significant change because EMA401 (100 mg/kg) significantly lowered tumor weight by 33% after 8 weeks treatment (example 5) but lowered tumor weight by 26% in this 4 week study (a decrease that was not statistically significant).

Additionally, it is to be noted that in the four-week in vivo study (Example 7), the combination of Spironolactone 100 mg/kg and Losartan 60 mg/kg is more effective than either alone. Also, the 100 mg/kg/day dose is equivalent to about 600 mg/day in humans, which is 1.5 times a dose used in patients with hyperaldosteronism.

Overall Summary of Experimental Findings

The RAAS is active in cardiovascular homeostasis and pathology. However, it should be understood that the mineralocorticoid receptor responsible for aldosterone action influences the activities of the RAS even at the tissue and cellular level creating a variant RAAS. The current consensus is that any activity RAAS drugs may have against PDA is the result of blocking the effects of angiotensin II on angiogenesis and tissue environment or of drug specific effects unrelated to RAAS mediated cell proliferation. This view is accepted primarily because clinically used doses of these drugs affect angiogenesis and tissue biology, but not tumor cell proliferation. In the present disclosure it is shown that the RAAS is involved in PDA cell proliferation and also tumor growth, and that therapies directed against the RAAS, if properly employed, can be therapeutically beneficial.

Angiotensin II (AII) binds to both its type I receptor (AT1R) and type 2 receptor (AT2R). The actions of AII at the AT2R generally, but not always, mitigate or oppose angiotensin II action at the AT1R. AT2R agonists may therefore act as possible therapies for PDCA. The present disclosure demonstrates that AT2R blockade inhibits PDCA tumor growth in vivo.

Disclosed herein is experimental data showing that AT2R inhibition is an effective therapy in specific cancers, including pancreatic ductal carcinoma. The present disclosure illustrates that AT2R blocking drugs are effective against two PDCA cell lines (PANC-1 and HS766T) in culture as well as PaCa9 patient cancer cells. The AT2R blocker EMA401 is active against the PDCA cell lines tested at concentrations between 10 and 50 µM in vitro. Synergism with the ARBs (specifically, losartan and candesartan) has also been disclosed herein. These results indicate that the RAAS is operative in PDA proliferation and PDA tumor growth, and point to the use of these agents for cancer therapy. This indicates that therapies based on the RAAS are viable options for cancer treatments.

In vivo EMA401 has been employed at a low dose (60 mg/kg) and a higher dose (100 mg/kg), in accordance with the present disclosure. Using a 12:1 ratio of drug dosage in mice compared to humans, the 60 mg/kg per day dose in mice corresponds to 400 mg per day in humans. EMA401 at 400 mg per day has been given to human study subjects. The 100 mg/kg per day dose in mice equates to a 640 mg per day dose in humans, slightly higher than in a proposed 600 mg/day trial for diabetic neuropathy. Thus, the effective EMA401 doses used here in mice are achievable in humans. This is the first disclosure that demonstrates the efficacy of AT2R blockade (using EMA401) against PDCA in vivo.

Thus, this disclosure deals with the RAAS in PDCA and involves studies of AT2R in PDCA. As disclosed herein, the investigational AT2R blocker EMA401 inhibits the growth of PDCA cells in culture and in an in vivo model of PDCA. Moreover, EMA401 can inhibit the growth of some PDCA cells at concentrations that are only slightly higher than those used in human trials of the drug for neuropathic pain. EMA401 can also synergize with the AT1R blockers (candesartan and losartan) in accordance with the present disclosure. Collectively, these studies demonstrate that EMA401, and by extension other AT2R blockers, reduce the growth of PDCA cells/tumors and also synergizes with AT1R blockers, permitting the use of lower drug concentrations to achieve therapeutic benefit in the treatment and maintenance therapy of PDCA. Specifically, the studies herein indicate that there is synergy between EMA401 and losartan, and between EMA401 and candesartan in reducing PDCA cellular proliferation in vitro. In vivo there is synergy between EMA401 and losartan in reducing PDCA tumor growth. Collectively, these examples demonstrate synergy between AT2R blockade and AT1R blockade. The use of AT2R blockade, alone or in combination with AT1R blockade, represents an entirely new approach to treating PDCA.

It may be understood that the use of high doses of RAAS agents may require monitoring and adjustment of serum potassium and volume status. At least in the case of Candesartan and Losartan, these doses can be safely achieved given the safety profiles of these drugs and established principles of cardiovascular and RAAS physiology. Collectively, the results disclosed herein indicate that therapies directed against the tumor RAAS, if properly employed in terms of dose and duration, are therapeutically beneficial in treating cancer (e.g., PDA).

Thus, in one aspect, the present disclosure provides a method of altering one or more components of the renin-angiotensin-aldosterone system (RAAS) in a subject suffering from a condition or disease, comprising: administering to the subject an effective amount of one or more of an angiotensin receptor AT2R antagonist for a duration sufficient to elicit a desired response in the subject suffering from the condition or disease.

In some embodiments, the angiotensin receptor AT2R antagonist is EMA401 or a derivative thereof, or PD123319 or a derivative thereof. In some cases, the angiotensin receptor AT2R antagonist is EMA401, wherein the effective amount of EMA401 is selected from a range of 5 mg/kg/day to 8.5 mg/kg/day. In some cases, the angiotensin receptor AT2R antagonist is PD123319, wherein the effective amount of PD123319 is selected from a range of 5 mg/kg/day to 8.5 mg/kg/day.

In some embodiments, the present method further comprises administering to the subject an effective amount of one or more of an angiotensin receptor AT1R antagonist in combination with the angiotensin receptor AT2R antagonist. In some embodiments, the angiotensin receptor AT1R antagonist is Losartan or a derivative thereof, or Candesartan or a derivative thereof. In some cases, the angiotensin receptor AT1R antagonist is Losartan, wherein the effective amount of Losartan is selected from a range of 4 mg/kg/day to 6 mg/kg/day. In some cases, the angiotensin receptor AT1R antagonist is Candesartan, wherein the effective amount of Candesartan is selected from a range of 1.5 mg/kg/day to 3.5 mg/kg/day.

In some embodiments, the condition or disease is cancer. In some cases, the cancer is pancreatic ductal adenocarcinoma. In some embodiments, the desired response is a reduction in one or more signs or symptoms associated with the cancer. In some cases, the desired response comprises a decrease in a mass of a tumor associated with the cancer. In some embodiments, the duration is at least four weeks.

In some embodiments, the method further comprises monitoring the subject for signs of hypotension during the administering; and responsive to an indication of hypotension, infusing to the subject a salt solution of a determined volume for a determined duration. In some cases, the salt solution is sodium chloride at 200 milliequivalents in water, the determined volume is between 350 and 750 mL, and the determined duration is between 1.5 hours and 3 hours. In some embodiments, the method further comprises monitoring the subject for signs of hypotension during the administering; and responsive to an indication of hypotension, prescribing the subject a high sodium diet of greater than 210 milliequivalents per day.

In some embodiments, the administering occurs prior, during and/or following a chemotherapy treatment. In some cases, the chemotherapy treatment includes providing to the subject one or more of alkylating agent(s) that do not enter the brain of the subject, alkylating agent(s) capable of entering the brain of the subject, antimetabolite(s), antitumor antibiotic(s), topoisomerase inhibitor(s), mitotic inhibitor(s), corticosteroid(s), hormone therapy, and immunotherapy.

In some embodiments, the cancer is in remission; and the administering is additionally or alternatively part of a maintenance therapy regimen. In some cases, the administering as part of the maintenance therapy regimen further comprises administering one or more other drugs, vaccines, or antibodies that act to kill cancer cells.

In some embodiments, the cancer is one or more of Acanthoma, Acinic cell carcinoma, Acoustic neuroma, Acral lentiginous melanoma, Acrospiroma, Acute eosinophilic leukemia, Acute lymphoblastic leukemia, Acute megakaryoblastic leukemia, Acute monocytic leukemia, Acute myeloblastic leukemia with maturation, Acute myeloid dendritic cell leukemia, Acute myeloid leukemia, Acute promyelocytic leukemia, Adamantinoma, Adenocarcinoma, Adenoid cystic carcinoma, Adenoma, Adenomatoid odontogenic tumor, Adrenocortical carcinoma, Adult T-cell leukemia, Aggressive NK-cell leukemia, AIDS-Related Cancers, AIDS-related lymphoma, Alveolar soft part sarcoma, Ameloblastic fibroma, Anal cancer, Anaplastic large cell lymphoma, Anaplastic thyroid cancer, Angioimmunoblastic T-cell lymphoma, Angiomyolipoma, Angiosarcoma, Appendix cancer, Astrocytoma, Atypical teratoid rhabdoid tumor, Basal cell carcinoma, Basal-like carcinoma, B-cell leukemia, B-cell lymphoma, Bellini duct carcinoma, Biliary tract cancer, Bladder cancer, Blastoma, Bone Cancer, Bone tumor, Brain Stem Glioma, Brain Tumor, Breast Cancer, Brenner tumor, Bronchial Tumor, Bronchioloalveolar carcinoma, Brown tumor, Burkitt's lymphoma, Cancer of Unknown Primary Site, Carcinoid Tumor, Carcinoma, Carcinoma in situ, Carcinoma of the penis, Carcinoma of Unknown Primary Site, Carcinosarcoma, Castleman's Disease, Central Nervous System Embryonal Tumor, Cerebellar Astrocytoma, Cerebral Astrocytoma, Cervical Cancer, Cholangiocarcinoma, Chondroma, Chondrosarcoma, Chordoma, Choriocarcinoma, Choroid plexus papilloma, Chronic Lymphocytic Leukemia, Chronic monocytic leukemia, Chronic myelogenous leukemia, Chronic Myeloproliferative Disorder, Chronic neutrophilic leukemia, Clear-cell tumor, Colon Cancer, Colorectal cancer, Craniopharyngioma, Cutaneous T-cell lymphoma, Degos disease, Dermatofibrosarcoma protuberans, Dermoid cyst, Desmoplastic small round cell tumor, Diffuse large B cell lymphoma, Dysembryoplastic neuroepithelial tumor, Embryonal carcinoma, Endodermal sinus tumor, Endometrial cancer, Endometrial Uterine Cancer, Endometrioid tumor, Enteropathy-associated T-cell lymphoma, Ependymoblastoma, Ependymoma, Epithelioid sarcoma, Erythroleukemia, Esophageal cancer, Esthesioneuroblastoma, Ewing Family of Tumor, Ewing Family Sarcoma, Ewing's sarcoma, Extracranial Germ Cell Tumor, Extragonadal Germ Cell Tumor, Extrahepatic Bile Duct Cancer, Extramammary Paget's disease, Fallopian tube cancer, Fetus in fetu, Fibroma, Fibrosarcoma, Follicular lymphoma, Follicular thyroid cancer, Gallbladder Cancer, Ganglioglioma, Ganglioneuroma, Gastric Cancer, Gastric lymphoma, Gastrointestinal cancer, Gastrointestinal Carcinoid Tumor, Gastrointestinal Stromal Tumor, Gastrointestinal stromal tumor, Germ cell tumor, Germinoma, Gestational choriocarcinoma, Gestational Trophoblastic Tumor, Giant cell tumor of bone, Glioblastoma multiforme, Glioma, Gliomatosis cerebri, Glomus tumor, Glucagonoma, Gonadoblastoma, Granulosa cell tumor, Hairy Cell Leukemia, Hairy cell leukemia, Head and Neck Cancer, Head and neck cancer, Heart cancer, Hemangioblastoma, Hemangiopericytoma, Hemangiosarcoma, Hematological malignancy, Hepatocellular carcinoma, Hepatosplenic T-cell lymphoma, Hereditary breast-ovarian cancer syndrome, Hodgkin Lymphoma, Hodgkin's lymphoma, Hypopharyngeal Cancer, Hypothalamic Glioma, Inflammatory breast cancer, Intraocular Melanoma, Islet cell carcinoma, Islet Cell Tumor, Juvenile myelomonocytic leukemia, Kaposi Sarcoma, Kidney Cancer, Klatskin tumor, Krukenberg tumor, Laryngeal Cancer, Lentigo maligna melanoma, Leukemia, Lip and Oral Cavity Cancer, Liposarcoma, Lung cancer, Luteoma, Lymphangioma, Lymphangiosarcoma, Lymphoepithelioma, Lymphoid leukemia, Lymphoma, Macroglobulinemia, Malignant Fibrous Histiocytoma, Malignant fibrous histiocytoma, Malignant Fibrous Histiocytoma of Bone, Malignant Glioma, Malignant Mesothelioma, Malignant peripheral nerve sheath tumor, Malignant rhabdoid tumor, Malignant triton tumor, MALT lymphoma, Mantle cell lymphoma, Mast cell leukemia, Mediastinal germ cell tumor, Mediastinal tumor, Medullary thyroid cancer, Medulloblastoma, Medulloepithelioma, Melanoma, Meningioma, Merkel Cell Carcinoma, Mesothelioma, Metastatic Squamous Neck Cancer with Occult Primary, Metastatic urothelial carcinoma, Mixed Mullerian tumor, Monocytic leukemia, Mouth Cancer, Mucinous tumor, Multiple Endocrine Neoplasia Syndrome, Multiple myeloma, Mycosis Fungoides, Myelodysplastic Disease, Myelodysplastic Syndromes, Myeloid leukemia, Myeloid sarcoma, Myeloproliferative Disease, Myxoma, Nasal Cavity Cancer, Nasopharyngeal Cancer, Nasopharyngeal carcinoma, Neoplasm, Neurinoma, Neuroblastoma, Neurofibroma, Neuroma, Nodular melanoma, Non-Hodgkin lymphoma, Nonmelanoma Skin Cancer, Non-Small Cell Lung Cancer, Ocular oncology, Oligoastrocytoma, Oligodendroglioma, Oncocytoma, Optic nerve sheath meningioma, Oral cancer, Oropharyngeal Cancer, Osteosarcoma, Ovarian cancer, Ovarian Epithelial Cancer, Ovarian Germ Cell Tumor, Ovarian Low Malignant Potential Tumor, Paget's disease of the breast, Pancoast tumor, Pancreatic cancer, Papillary thyroid cancer, Papillomatosis, Paraganglioma, Paranasal Sinus Cancer, Parathyroid Cancer, Penile Cancer, Perivascular epithelioid cell tumor, Pharyngeal Cancer, Pheochromocytoma, Pineal Parenchymal Tumor of Intermediate Differentiation, Pineoblastoma, Pituicytoma, Pituitary adenoma, Pituitary tumor, Plasma Cell Neoplasm, Pleuropulmonary blastoma, Polyembryoma, Precursor T-lymphoblastic lymphoma, Primary central nervous system lymphoma, Primary effusion lymphoma, Primary Hepatocellular Cancer, Primary Liver Cancer, Primary peritoneal cancer, Primitive neuroectodermal tumor, Prostate cancer, Pseudomyxoma peritonei, Rectal Cancer, Renal cell carcinoma, Respiratory Tract Carcinoma Involving the NUT Gene on Chromosome 15, Retinoblastoma, Rhabdomyoma, Rhabdomyosarcoma, Richter's transformation, Sacrococcygeal teratoma, Salivary Gland Cancer, Sarcoma, Schwannomatosis, Sebaceous gland carcinoma, Secondary neoplasm, Seminoma, Serous tumor, Sertoli-Leydig cell tumor, Sex cord-stromal tumor, Sezary Syndrome, Signet ring cell carcinoma, Skin Cancer, Small blue round cell tumor, Small cell carcinoma, Small Cell Lung Cancer, Small cell lymphoma, Small intestine cancer, Soft tissue sarcoma, Somatostatinoma, Soot wart, Spinal Cord Tumor, Spinal tumor, Splenic marginal zone lymphoma, Squamous cell carcinoma, Stomach cancer, Superficial spreading melanoma, Supratentorial Primitive Neuroectodermal Tumor, Surface epithelial-stromal tumor, Synovial sarcoma, T-cell acute lymphoblastic leukemia, T-cell large granular lymphocyte leukemia, T-cell leukemia, T-cell lymphoma, T-cell prolymphocytic leukemia, Teratoma, Terminal lymphatic cancer, Testicular cancer, Thecoma, Throat Cancer, Thymic Carcinoma, Thymoma, Thyroid cancer, Transitional Cell Cancer of Renal Pelvis and Ureter, Transitional cell carcinoma, Urachal cancer, Urethral cancer, Urogenital neoplasm, Uterine sarcoma, Uveal melanoma, Vaginal Cancer, Verner Morrison syndrome, Verrucous carcinoma, Visual Pathway Glioma, Vulvar Cancer, Waldenstrom's macroglobulinemia, Warthin's tumor, and Wilms' tumor.

In another aspect, the present disclosure provides a method of treating a subject having a condition/disorder or disease that is at least in part regulated by activity of the renin-angiotensin-aldosterone system (RAAS), comprising: contacting a cell or cells of the subject with an effective amount of one or more RAAS modulatory agents, the one or more RAAS modulatory agents comprising one or more of an angiotensin receptor AT2R antagonist and an angiotensin receptor AT1R antagonist to alter one or more components of the RAAS, thereby treating the condition/disorder or disease.

In some embodiments, the angiotensin receptor AT2R antagonist is EMA401 or a derivative thereof, or PD123319 or a derivative thereof. In some cases, the angiotensin receptor AT2R antagonist is EMA401, wherein the effective amount of EMA401 is selected from a range of 5 mg/kg/day to 8.5 mg/kg/day. In some cases, the angiotensin receptor AT2R antagonist is PD123319, wherein the effective amount of PD123319 is selected from a range of 5 mg/kg/day to 8.5 mg/kg/day.

In some embodiments, the angiotensin receptor AT1R antagonist is Losartan or a derivative thereof, or Candesartan or a derivative thereof. In some cases, the angiotensin receptor AT1R antagonist is Losartan, wherein the effective amount of Losartan is selected from a range of 4 mg/kg/day to 6 mg/kg/day. In some cases, the angiotensin receptor AT1R antagonist is Candesartan, wherein the effective amount of Candesartan is selected from a range of 1.5 mg/kg/day to 3.5 mg/kg/day.

In some embodiments, the cells of the subject are contacted with the one or more RAAS modulatory agents at least for a duration of 4 weeks. In some embodiments, the condition or disease is cancer. In some cases, the cancer is pancreatic ductal adenocarcinoma. In some embodiments, treating the condition/disorder or disease further comprises reducing one or more signs or symptoms associated with the cancer. In some cases, reducing one or more signs or symptoms associated with the cancer comprises a decrease in a mass of a tumor associated with the cancer.

In some embodiments, treating the subject further comprises monitoring the subject for signs of hypotension; and responsive to an indication of hypotension, infusing to the subject a salt solution of a determined volume for a determined duration. In some cases, the salt solution is sodium chloride at 200 milliequivalents in water, the determined volume is between 350 and 750 mL, and the determined duration is between 1.5 hours and 3 hours. In some embodiments, treating the subject further comprises monitoring the subject for signs of hypotension; and responsive to an indication of hypotension, prescribing the subject a high sodium diet of greater than 210 milliequivalents per day.

In some embodiments, the administering occurs prior, during and/or following a chemotherapy treatment. In some cases, the chemotherapy treatment includes providing to the subject one or more of alkylating agent(s) that do not enter the brain of the subject, alkylating agent(s) capable of entering the brain of the subject, antimetabolite(s), anti-tumor antibiotic(s), topoisomerase inhibitor(s), mitotic inhibitor(s), corticosteroid(s), hormone therapy, and immunotherapy. In some embodiments, the cancer is in remission; and the administering is additionally or alternatively part of a maintenance therapy regimen.

In another aspect, the present disclosure provides a method of treating a subject suffering from pancreatic cancer, comprising: administering to the subject an effective amount of one or more of an angiotensin receptor AT2R antagonist and an angiotensin receptor AT1R antagonist for a duration sufficient to elicit a desired response in the subject suffering from pancreatic cancer. In some embodiments, the pancreatic cancer is pancreatic ductal adenocarcinoma.

In some embodiments, the angiotensin receptor AT2R antagonist is EMA401 or a derivative thereof, or PD123319 or a derivative thereof. In some cases, the angiotensin receptor AT2R antagonist is EMA401, wherein the effective amount of EMA401 is selected from a range of 5 mg/kg/day to 8.5 mg/kg/day. In some cases, the angiotensin receptor AT2R antagonist is PD123319, wherein the effective amount of PD123319 is selected from a range of 5 mg/kg/day to 8.5 mg/kg/day.

In some embodiments, the angiotensin receptor AT1R antagonist is Losartan or a derivative thereof, or Candesartan or a derivative thereof. In some cases, the angiotensin receptor AT1R antagonist is Losartan, wherein the effective amount of Losartan is selected from a range of 4 mg/kg/day to 6 mg/kg/day. In some cases, the angiotensin receptor AT1R antagonist is Candesartan, wherein the effective amount of Candesartan is selected from a range of 1.5 mg/kg/day to 3.5 mg/kg/day.

In some embodiments, the desired response is a reduction in one or more signs or symptoms associated with the pancreatic cancer. In some cases, the desired response is a decrease in a mass of a tumor associated with the pancreatic cancer. In some embodiments, the method further comprises monitoring the subject for signs of hypotension during the administering; and responsive to an indication of hypotension, infusing to the subject a salt solution of a determined volume for a determined duration. In some cases, the salt solution is sodium chloride at 200 milliequivalents in water, the determined volume is between 350 and 750 mL, and the determined duration is between 1.5 hours and 3 hours. In some embodiments, the method further comprises monitoring the subject for signs of hypotension during the administering; and responsive to an indication of hypotension, prescribing the subject a high sodium diet of greater than 210 milliequivalents per day.

In some embodiments, the administering occurs prior, during and/or following a chemotherapy treatment. In some cases, the chemotherapy treatment includes providing to the subject one or more of alkylating agent(s) that do not enter the brain of the subject, alkylating agent(s) capable of entering the brain of the subject, antimetabolite(s), anti-tumor antibiotic(s), topoisomerase inhibitor(s), mitotic inhibitor(s), corticosteroid(s), hormone therapy, and immunotherapy. In some embodiments, the pancreatic cancer is in remission; and the administering is additionally or alternatively part of a maintenance therapy regimen. In some cases, the administering reduces a rate at which cells of the pancreatic cancer proliferate.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of treating a subject suffering from pancreatic cancer, comprising:
   administering to the subject an effective amount of EMA401 and an effective amount of an angiotensin receptor AT1R antagonist, wherein the angiotensin receptor AT1R antagonist is Losartan or Candesartan, for a duration sufficient to lessen, ameliorate, eliminate, or inhibit at least one symptom of pancreatic cancer in the subject suffering from pancreatic cancer.

2. The method of claim 1, wherein the pancreatic cancer is pancreatic ductal adenocarcinoma.

3. The method of claim 2,
   wherein the effective amount of EMA401 is selected from a range of 5 mg/kg/day to 8.5 mg/kg/day.

4. The method of claim 1, wherein the angiotensin receptor AT1R antagonist is Losartan; and
   wherein the effective amount of Losartan is selected from a range of 4 mg/kg/day to 6 mg/kg/day.

5. The method of claim 1, wherein the angiotensin receptor AT1R antagonist is Candesartan; and
   wherein the effective amount of Candesartan is selected from a range of 1.5 mg/kg/day to 3.5 mg/kg/day.

* * * * *